US012080150B2

(12) United States Patent
Liese et al.

(10) Patent No.: US 12,080,150 B2
(45) Date of Patent: Sep. 3, 2024

(54) SERVICE DEVICE FOR A FIRE PROTECTION SYSTEM, CORRESPONDING FIRE PROTECTION SYSTEM, SYSTEM FOR OPERATING A FIRE PROTECTION SYSTEM, AND ASSOCIATED METHOD

(71) Applicant: Minimax Viking Research & Development GmbH, Bad Oldesloe (DE)

(72) Inventors: Henning Liese, Reinfeld (DE); Detlef Mandelkau, Bad Schwartau (DE); Oliver Wissmann, Albstadt (DE); Bernd Hallwass-Fedder, Hamburg (DE); André Lickefett, Herrnburg (DE)

(73) Assignee: Minimax Viking Research & Development GmbH, Bad Oldesloe (DE)

( * ) Notice: Subject to any disclaimer, the term of this patent is extended or adjusted under 35 U.S.C. 154(b) by 201 days.

(21) Appl. No.: 17/607,290

(22) PCT Filed: Apr. 30, 2020

(86) PCT No.: PCT/EP2020/062016
§ 371 (c)(1),
(2) Date: Mar. 17, 2022

(87) PCT Pub. No.: WO2020/225089
PCT Pub. Date: Nov. 12, 2020

(65) Prior Publication Data
US 2023/0351883 A1    Nov. 2, 2023

(30) Foreign Application Priority Data
May 6, 2019   (DE) ............... 10 2019 111 612.0

(51) Int. Cl.
*G08B 29/00* (2006.01)
*G08B 29/14* (2006.01)
(Continued)

(52) U.S. Cl.
CPC .......... *G08B 29/145* (2013.01); *G08B 29/18* (2013.01); *H04L 12/2825* (2013.01)

(58) Field of Classification Search
CPC ...... G08B 17/00; G08B 25/008; G08B 25/14; G08B 29/123; G08B 29/145; G08B 17/10;
(Continued)

(56) References Cited

U.S. PATENT DOCUMENTS

| 9,552,720 B2 * | 1/2017 | Moffa ................... G08B 25/14 |
| 2008/0084291 A1 * | 4/2008 | Campion ............. G08B 29/145 340/514 |
| 2018/0005513 A1 | 1/2018 | Venkatesh et al. |

FOREIGN PATENT DOCUMENTS

| DE | 102009060417 | 6/2011 |
| EP | 3264385 | 1/2018 |

(Continued)

OTHER PUBLICATIONS

International Searching Authority, International Search Report with English translation, International Application No. PCT/EP2020/062016, 11 pages; dated Sep. 28, 2020.
(Continued)

*Primary Examiner* — Dionne Pendleton
(74) *Attorney, Agent, or Firm* — Perkins Coie LLP

(57) ABSTRACT

A fire protection system, which is configured to communicate with a central device of the fire protection system and with at least one user terminal in order to grant the user terminal access to at least part of the system information of the fire protection system, wherein the service device pro-
(Continued)

cesses the system information for transmission to the at least one user terminal, transmits it to the user terminal and adjusts it in response to user input. A fire protection system configured to communicate with such a service device, a system for operating a fire protection system with such a service device, and a corresponding method for operating the fire protection system is provided.

27 Claims, 6 Drawing Sheets

(51) Int. Cl.
*G08B 29/18* (2006.01)
*H04L 12/28* (2006.01)

(58) Field of Classification Search
CPC .... G08B 25/10; G08B 29/043; G08B 29/046; G08B 29/126; G08B 29/14; G06Q 10/067; G06Q 10/10; G06Q 30/02; G06Q 30/0601; G06Q 40/12; G06Q 30/0263; G06Q 30/0282; G06Q 50/01; G06F 21/57; G06F 18/217; G06F 21/32; H04L 63/20; H04L 67/02; H04W 48/10; H04W 48/12; H04W 84/12; G06V 10/454; G06V 40/165; G06V 40/171; G06V 40/172; G06K 7/10; G06K 7/10881; H04M 1/2755; H04M 1/72403
See application file for complete search history.

(56) References Cited

FOREIGN PATENT DOCUMENTS

| WO | WO2011076184 | 6/2011 |
|----|--------------|--------|
| WO | WO2015/107449 | 7/2015 |

OTHER PUBLICATIONS

International Searching Authority, Written Opinion with English translation, International Application No. PCT/EP2020/062016, 30 pages; dated Sep. 28, 2020.

McGraw-Hill, Dictionary of Scientific and Technical Terms, Fifth Edition, 1994, pp. 312-313.

\* cited by examiner

SERVICE DEVICE FOR A FIRE PROTECTION SYSTEM, CORRESPONDING FIRE PROTECTION SYSTEM, SYSTEM FOR OPERATING A FIRE PROTECTION SYSTEM, AND ASSOCIATED METHOD

PRIORITY CLAIM AND INCORPORATION BY REFERENCE

This application is a 35 U.S.C. § 371 application of International Application No. PCT/EP2018/061152, filed May 20, 2018, which claims the benefit of German Application No. 10 2017 109 366.4, filed May 2, 2017, each of which is incorporated by reference in its entirety.

TECHNICAL FIELD

The present invention relates to a service device for a fire protection system, a corresponding fire protection system, a system for operating such a fire protection system with a service device, and a method for operating a fire protection system using the service device.

BACKGROUND AND SUMMARY OF THE INVENTION

In this context, a fire protection system is any type of system that can be used for the purpose of (preventive) fire protection in buildings, halls, rooms or similar. Such fire protection systems may include, without limitation, fire alarm systems, fire extinguishing systems, spark extinguishing systems, smoke extraction systems and/or a combination of these. Fire protection systems within the meaning of the invention are in particular systems which comprise a central device and one or more peripheral devices and/or components which are in communicative connection with the central device.

In a specific embodiment, the fire protection system is in particular a fire alarm system. Fire alarm systems typically comprise a fire alarm center (or a fire alarm and extinguishing control center) as the central device and, as an example of one or more peripheral devices, one or more fire detectors, which may be designed as combustion gas or flue gas detectors, smoke detectors, flame detectors, spark detectors, and/or heat detectors, and alarm means, which may be designed as horns, sirens, beacons, flashing lights, or the like.

In response to the detection of a (potential) fire event, the fire alarm center receives a corresponding signal from the one or more corresponding fire detectors. The fire alarm center then causes the fire alarm system to issue a hazard alarm. In response to such a hazard alarm, an extinguishing system, which is in communicative connection with the fire alarm system, in particular with its central device, can then be triggered. Furthermore, the central device of the fire alarm system can also take other actions, such as triggering the alarm means, alerting a fire department, providing escape movement controls, closing fire protection closures, or the like. In this way, fire events such as fires or ignition sources in the area protected by the fire protection system can be detected at an early stage, even if no persons are present in the protected area at the time of the fire event. Further spread of the fire event can thus be prevented, if need be.

The extinguishing systems triggered by the fire alarm system may be, for example, but not exclusively, sprinkler systems, water spray extinguishing systems, foam extinguishing systems, gas extinguishing systems, powder extinguishing systems, or the like, which may be used in particular to extinguish a fire. However, the term extinguishing system can also include fire prevention systems, such as inerting systems or similar systems for active fire prevention.

Fire extinguishing systems are permanently operational systems which serve to distribute an extinguishing agent, such as water, foam, gas or powder, and use such agent to contain or extinguish fires that have already started. They consist of a piping system with appropriate outlet openings, such as sprinklers or extinguishing nozzles, through which an extinguishing agent, such as water, gas or powder, can be discharged onto a fire event, in order to contain the fire until the fire department arrives to (permanently) extinguish it. In the most favorable case, the extinguishing system can extinguish the fire on its own.

The triggering mechanism of the extinguishing system can be designed mechanically, for example by closing the outlet openings with a glass ampoule or a fusible link, which are designed to be destroyed by high temperatures and thus release the extinguishing agent. In some embodiments, the extinguishing system may also be triggered manually, for example, by operating a switch or opening a stopcock. In the fire protection systems according to the invention, the extinguishing system is typically triggered by the fire alarm system when this system automatically or manually detects a (potential) fire event. In the following, the combination of a fire alarm system and an extinguishing system is also referred to as a fire protection system.

It is of great importance that fire protection systems operate with great reliability and are furthermore reliably able to detect (potential) fire events and initiate appropriate measures. It is therefore one of the duties of operators of such fire protection systems to perform inspections and/or maintenance on them on a regular basis.

Such inspection and/or maintenance must be performed by a user on site. In some instances, the fire protection system may be located in a remote and/or difficult-to-reach location. In such a case, inspection and/or maintenance operations scheduled at short notice cannot be carried out or can only be carried out with great difficulty. If a fault occurs, it can only be remedied with considerable expenditure of time, so that in such cases the fire protection systems must essentially respond autonomously. However, autonomous troubleshooting is not always sufficient and the deployment of maintenance personnel may also be necessary in this case.

It is therefore advantageous to perform certain inspections and/or maintenance operations via remote monitoring and/or remote maintenance. According to the state of the art, it is necessary to design the fire protection systems to be inspected/maintained in this way for such remote inspection and/or remote maintenance from the outset. This leads to further difficulties, because on the one hand, remote monitoring can only be carried out for fire protection systems specially designed for this purpose, and on the other hand, in such fire protection systems, individual components and/or peripheral devices can only be removed and/or added with great effort, since these must once again be designed for remote monitoring from the outset.

In this context, WO 2011/076184 A1 teaches a communication device which enables remote monitoring and/or remote maintenance of a security system, on the one hand, and a modular design—and thus retrofitting capability—on the other. This communication device is "placed upstream" of the existing system, so to speak, so that the communication device and the system operate independently of each other, such that the communication device and the system act autonomously. However, the functionalities of the communication device of WO 2011/076184 A1 are limited to providing a communication link between a security system and a user who is located remotely therefrom. Thus, the communication device of WO 2011/076184 A1 merely represents a kind of "communication tunnel" for transmitting information from the security system to the user. Although this can enable a remote inspection, the communication device of WO 2011/076184 A1 cannot ensure more extensive functions, such as user-dependent access restrictions.

However, in the case of fire protection systems, it is desirable for a plurality of different users with different access rights to be able to remotely access information related to the system. According to the state of the art, access authorization is usually divided into four preset normative authorization levels, namely the installer of the fire protection system, certified maintenance personnel, the experienced user of the fire protection system, such as an appropriately trained fire protection officer, and, finally, the non-experienced user.

If the user is an employee of an installer of the fire protection system who wants to inspect the fire protection system regularly, in particular wants to compare certain actual values of the fire protection system and of peripheral devices located therein with the expected calibration values, and/or wants to identify possible faults at an early stage, and in the event of such faults and/or deviations wants to carry out appropriate revisions, the user is given comprehensive access to preferably all aspects of the fire protection system for this purpose.

On the other hand, a user may also be a controller who has been certified to maintain the fire protection system and commissioned to do so. It is not usually desired that a controller receives the detailed information on the actual and/or calibration values of the fire protection system and/or peripheral devices, and/or detailed information on the faults and their possible causes. The controller is usually interested in what materials are needed for maintenance and what configuration of the fire protection system to expect. This allows the controller to identify the amount of work and materials needed without having to travel to the site first, thus making maintenance more efficient and reducing time. The user therefore only gets access to that part of the system information, i.e. the information about the fire protection system, which is relevant for these aspects.

Lastly, a user can also be the customer himself, for example. For this purpose, a distinction will be made between the experienced user—in particular the customer's fire protection officer—and the non-experienced user—for example, an employee of a customer who has no experience in fire protection. An experienced user may be particularly interested in whether the fire protection system and the peripheral devices located therein are in operation and what their current state is. The experienced user is thus granted access to the relevant system information for this purpose. The non-experienced user, on the other hand, cannot work with the system information and should not be able to make any changes to the fire protection system settings. Therefore, the non-experienced user does not get access to the system information.

The data to be provided for each user may therefore vary. It is often the case that, for all users, the data is based on the same system information provided by the fire protection system control center, but it must be filtered and/or processed differently depending on the user. In this context, it is particularly advantageous to provide a system that allows the access authorization for users to be designed more individually—with a view to the normative authorization levels, but independent thereof—and thus allows a higher degree of detail when assigning access and roles to individual users. This makes it possible to establish role-based access authorizations.

Against this background, it is an object of the invention to provide a system for operating a fire protection system in which the problems described above are overcome. In particular, it is an object of the invention to provide communication between a fire protection system and a user terminal of a user, through which communication the user can be appropriately informed about the state of the fire protection system and/or the peripheral devices located therein. It is a further object of the invention to provide a system that allows to configure the access authorizations of individual users with a higher degree of detail.

According to the invention, this object is achieved in a first aspect by a service device for a fire protection system comprising a communication device which is configured to communicate with a central device of the fire protection system via a first bidirectional communication link and to communicate with at least one user terminal via a second bidirectional communication link in order to grant the user terminal access to at least a part of system information of the fire protection system, and at least one computing device configured to receive the system information from the central device and to process it for transmission to the at least one user terminal, to receive at least one user input from the user terminal in response to the transmitted system information, and to perform customization of the system information of the fire protection system based on the at least one user input.

Thus, to achieve the above object, a service device is provided which can act as a further data-processing component between a central device of the fire protection system, in particular a central device of a fire alarm system, and at least one user terminal.

For this purpose, the service device comprises a communication device, for example a transceiver, which is configured to communicate bidirectionally with both the central device and the user terminal. This means the communication device is configured to establish a first bidirectional communication link between itself and a corresponding central communication device of the central device. Preferably, the service device is provided at the location of the fire protection system. Thus, the communication between the communication device of the service device and the central communication device of the central device can be wired or wireless. Preferably, communication between the service device and the central device is wireless. In some embodiments, wired communication may be provided alternatively or additionally, in particular using a dedicated port in the central device. The communication between the communication device of the service device and the user terminal is preferably wireless, but may also be wired. In some embodiments, the communication between the communication device and the user terminal is in particular carried out via a cellular network using a known cellular technology. In other embodiments, the communication is carried out via another network.

In the following, a user terminal means in particular a laptop, a cell phone, data glasses or any other type of terminal that allows a user to display the transmitted system information. The user terminal is in particular configured to generate a graphical representation of the provided and processed system information in order to display it to the user.

In the following, the term system information is understood to mean all types of data describing the fire protection system and/or the peripheral devices and/or components contained therein. The system information may in particular comprise factory data, i.e. data that provides information about the hardware used, such as module designations, serial numbers and the like. Alternatively or additionally, the system information may also comprise operational data used for the operational configuration of the fire protection system, such as logic settings and configurable (changeable) parameters of the fire protection system and its associated peripheral devices. Alternatively or additionally, the system information may also comprise additional data generated during operation of the fire protection system comprising the peripheral devices, such as runtime data. At least part of this runtime data can also be used as state information, i.e. data indicative of the (operational) state of the fire protection system.

The processing of the system information can in particular be understood as processing in dependence on which user the processed system information is provided to. If the user is the installer, the system information is processed in a different way than if the user is a controller or a customer. The user can be identified in particular via the user terminal. In some embodiments, the identification may comprise entering an access code and/or password upon connection of the user terminal to the service device. Alternatively or additionally, the identification may comprise obtaining biometric data, such as a fingerprint or iris pattern, and identification based on the biometric data. Alternatively or additionally, the user may also be identified by a feature of the user terminal and/or a subscriber identification module used therein. In some embodiments, the identification may be performed independently of the user terminal.

Alternatively or additionally, processing the system information may comprise creating a log and/or a summary. In other embodiments, processing the system information may also comprise evaluating the system information to determine whether the fire protection system meets, for example, parameters specified by guidelines, such as approval and/or safety standards, or operates within the threshold values specified by guidelines. In some embodiments, the processing may also comprise comparing the measured (actual) values with corresponding calibration values (target values) of the state information determined during operation, which state information, as part of the system information, may be indicative of the state of the fire protection system and/or the peripheral devices and/or components contained therein. In any case, it is provided that processing will be done in such a way that the system information is compiled for the respective user according to the role assigned to such user.

For example, if the user is the installer, logging may comprise, in particular, logging of that data of the system information that relates to specific inspection activities specified by guidelines, i.e., a type of maintenance log. Alternatively or additionally, such logging may concern the comparison of the measured (actual) values with the corresponding calibration values of the changeable parameters in the state information, which is indicative of the state of the fire protection system and/or the components and/or peripheral devices located therein, i.e. a kind of state log. In some embodiments, the evaluation of the system information may in particular be useful for real-time inspection of the fire protection system, wherein the values of the parameters of the system information, in particular the parameters of the state information, are provided to the user in real-time and, in particular, real-time messages are displayed, for example in case of faults or the like. Processing may also comprise processing of the system information, in particular the state information, in such a way that the user is provided with documentation about the fire protection system, its development over time and possible predictions for the future.

If the user is the controller, logging and/or summarizing may comprise in particular a summary of the state inspection and/or a summary of previous inspection and/or maintenance logs to provide the controller with an overview of the amount of work to be performed during the next maintenance/repair. In some embodiments, based on the evaluation, the user may also be provided with a summary and/or list of proposed materials needed for maintenance. In this case, a result of the evaluation, i.e. an evaluation result, can also be displayed so that the user can check for himself whether the list is complete. In some embodiments, processing may comprise creating an overview of the current configuration of the fire protection system—or of the individual components and/or peripheral devices therein.

If the user is an end user, processing of the data may comprise in particular a summary of the current actual state of the fire protection system, or of the components and/or peripheral devices located therein. In some embodiments, processing may also comprise filtering so that only system information that may be of interest to the user is displayed to the user. In some embodiments, this concerns in particular—in the case of a real-time display—such system information that deviates from the norm, in particular such state information that deviates from its calibration values. In some embodiments, the processing may comprise generating inspection logs, maintenance logs, and/or maintenance reports in this case as well. It is preferred that this log comprises less detailed information than in the case of the installer, for example. The processing may further comprise summarizing past values of one or more parameters of the system information, particularly of the state information. In some embodiments, the processing may also comprise an evaluation and an indication and/or a prediction of an expected fault and/or a trend for particular faults.

The user terminal preferably comprises a user input device for receiving a user input. The user terminal transmits such user input via the second bidirectional communication link to the communication device of the service device, which in turn forwards the input to the computing device. The computing device is configured to process the user input and adjust the system information of the fire protection system according to the user input.

In some embodiments, the user input comprises in particular an operations log input of a service technician, and adjusting the system information comprises in particular adding such operations log input to the inspection and/or maintenance logs and/or maintenance reports and/or other types of logs generated by the computing device based on the system information, in particular the state information.

In some embodiments, user input may also specify additional materials that are required for maintenance, and the computing device may be configured to determine on the basis of such materials which maintenance work is required. In some embodiments, adjusting based on user input may also comprise processing and/or providing additional system information. In some embodiments, adjusting the system information may comprise adjusting the configuration of one or more system parameters of the fire protection system and/or peripheral devices and/or components located therein, such that a user may configure the fire protection system via a remote connection, for example, because the user has recognized that such configuration is necessary. The scope of the configuration and/or adjustment of the system information and/or system parameters can depend in particular on the respective user or, respectively, such user's access rights and can be adjusted individually by the service device, i.e. independently of the normatively specified four authorization levels.

In a preferred embodiment, the second bidirectional communication link is configured to connect the communication device to the at least one user terminal via a server component.

According to one embodiment, the communication device of the service device is configured to communicate with a server component, which in turn is configured to communicate with the user terminal. This means that the bidirectional communication between the service device and the user terminal (or user terminals) is carried out via the server component. The server component may be configured to check the access rights of the user terminal on the one hand and the access rights of the service device on the other, and to allow access only if the check has a positive result. Alternatively or additionally, the server component may be configured to check the identification of the user terminal and/or service device and to determine whether a specific user terminal is allowed to communicate with a specific service device. In this case, as well, the server component may be configured to establish a connection only in the event of a positive identification. This can increase security against unauthorized access.

In some embodiments, the server component may in particular comprise a data memory in which system information can be stored. In this case, no final storage of the system information in the service device is necessary. Lastly, the service device can also perform at least part of the processing of the system information by a computing device of the server component, in particular if the server component comprises a data memory for storing past system information. On the one hand, this has the advantage of reducing the requirements placed on the service device, in particular an internal memory device thereof. Secondly, storing system information on a server component makes it possible for the service device to be replaced, in particular in the event of a failure and/or malfunction of the service device, without having to first transfer the data stored on it. Instead, a new service device can immediately access the system information and other data stored on the server component and thus continue to operate based on the status of the previously deployed service device.

According to another preferred embodiment, the first communication link and/or the second communication link comprises an encrypted communication link.

In some embodiments, the bidirectional communication link between the central communication device of the central device and the communication device of the service device may be encrypted. Alternatively or additionally, the bidirectional communication link between the communication device of the service device and the user terminal may be encrypted. For this purpose, both the service device and the central device as well as the user terminal can each comprise a cryptography device which encrypts and then transmits the system information according to known methods. In some embodiments, only the central device and the service device, or only the user terminal and the service device, may comprise a cryptography device if only one of the two bidirectional communication links of the service device is to be encrypted.

The keys used to encrypt the first bidirectional communication link between the central communication device and the communication device may also be used to authenticate the service device to the central device. In particular, the key may contain an authentication parameter that authenticates the service device to the central device and thus determines, for example, the access rights of the service device.

Alternatively or additionally, the keys used to encrypt the second bidirectional communication link between the communication device of the service device and the user terminal can also be used for authentication, wherein both the user terminal can authenticate itself to the service device and the service device can authenticate itself to the user terminal. In some embodiments, only the user terminal authenticates itself to the service device. In this case, as well, the authentication can be carried out using a corresponding authentication parameter within the encryption key. The authentication can also be used to identify the user.

In some embodiments, the key may also be used to ensure that the respective user has a license for the software installed on the service device and/or the central device. In some embodiments, this can be accomplished by replacing the key used after a period of time has passed for which a valid software license has been acquired, and providing a new key or renewing the previous key only when a new license is acquired. Preferably, this new key is provided immediately to the user terminal used by the user who purchased the license.

It is additionally preferred that the service device further comprises an identification device configured to transmit identification data of the service device to the central device and/or the at least one user terminal.

In some embodiments, identification of the service device is also accomplished by a dedicated identification device. For this purpose, the service device comprises a means by which the service device can identify itself, preferably by transmitting a corresponding identification number. Such identification is preferably made to the central device of the fire protection system. Alternatively or additionally, the service device may identify itself to one or more user terminals via the ID number.

In some embodiments, the identification device may also be configured to receive an identification number from the user terminal and/or the central device such that the identification is bidirectional. In some embodiments, the identification number may be transmitted only by the user terminal and/or the central device and the service device is not identified.

In some embodiments, the service device further comprises a memory device for storing the system information.

In some embodiments, the service device is provided with a memory device, such as a volatile memory and a non-volatile memory. This memory device is preferably used to store system information. In some embodiments, system information may only be stored on the service device. Alternatively or additionally, system information may also be stored in a data memory of the server component. In some embodiments, certain system information may also be stored only in the memory device of the service device and certain system information may be stored only in the data memory of the server component. In some embodiments, redundant storage is provided in the memory device of the service device and in the data memory of the server component. This increases the flexibility of the system, since in this way in particular the service device can be replaced without great effort, as well as the security of the storage, since the information is still available in another memory if one memory is destroyed.

In a technically more advanced embodiment, the computing device is further configured to recognize a difference between the system information stored in the memory device and the system information provided by the central device, and to adjust the system information in the memory device in response to the difference.

Not all system information is subject to variations over time. There is also system information, such as factory data, which (should) have constant values over a long period of time or permanently. In this case, retransmitting a value for such a system information, deleting the previous value and storing the new (same) value again represents an unnecessary use of system capacity. In order to avoid such a waste of resources and to reduce the amount of data to be transmitted, the computing device of the service device is preferably configured to determine a difference between the system information stored in the memory device and the system information provided by the central device, i.e. to determine which values of which system information have changed. The computing device is further configured to, in response to this determination, retrieve and rewrite to the memory device only that system information whose values have changed. All other system information is not stored again, optionally with a notification that it has remained constant.

According to another further development, the computing device is configured to recognize the difference upon the first communication link between the central device and the service device being established.

In some embodiments, this comparing of system information and the associated determination of any differences is preferably performed each time the first communication link is (re)established between the central communication device of the central device and the communication device of the service device. This can ensure that the service device stores the current status of the system information each time it is reconnected to the central device.

In some embodiments, the memory device is further configured to store a first software identification of software data, wherein the computing device is further configured to read, via the first communication link, a second software identification from the central device, such second software identification being indicative of the software data on the central device, to compare the first software identification and the second software identification, and, in response to determining that the first software identification and the second software identification differ, to transmit the software data to the central device (200) via the first communication link.

The service device can further be configured to check a firmware version of the central device or of a module located therein and, if necessary, to update such firmware to the current version.

For this purpose, the memory device of the service device is configured to store a first software identification. In the present context, a first software identification means in particular an identification number that is indicative of a software version of software data. Software data in this context means the data and codes constituting the firmware. The first software identification preferably specifies a current version of the software data.

A second software identification is also understood to mean, in particular, an identification number which is indicative of a software version of software data. The software version indicated by the second software identification is the version of the software data as it is currently loaded and active on the central device or the corresponding module.

Preferably, upon establishing the first bidirectional communication link between the central device and the service device, the first and second software identifications are compared by the computing device of the service device. In the case that the software version indicated by the second software identification, i.e. the software version which is active on the central device or a module thereof, differs from the software version indicated by the first software identification, the computing device of the service device is preferably configured to transmit the current software data by means of the communication device via the bidirectional communication link to the central device, where the software data can then be used to update the software version.

It is preferred that the software data in the current version are stored in the data memory of the server component. This means that the service device retrieves these current software data from the data memory of the server component and then transmits them to the central device. This ensures that the firmware is updated when the service device is started. The update can be initiated manually or automatically.

In some embodiments, such transmitting comprises first sending a request which asks whether the software version update is desired. In some embodiments, the service device transmits this request to the user terminal and the user terminal generates an indication, which may be haptic and/or acoustic and/or visual and/or the like, that an update is recommended. The user can then confirm this request, which will result in the transmission of the software data, or reject it. In this case, the update is not performed. Alternatively or additionally, the service device may be configured to transmit this request to the central device. The central device may be configured to either automatically check the request and, if updating is possible, acknowledge it to initiate the update. Alternatively or additionally, the central device may be configured to output an indication, which may be haptic and/or acoustic and/or visual and/or the like, to prompt a user of the central device to respond to the request. In this case, as well, the update is performed in response to a confirmation by the user.

The first and second software identifications may also be provided by means other than corresponding identification numbers. The only important thing at this point is that the format of the first and the second software identification allows comparing the two software identifications. It is thus preferable that the first and second software identifications be provided in the same format.

In some embodiments, the service device further comprises an indication device configured to output an indication when receiving of the system information is complete.

In this context, an indication device can be understood to be any type of device that provides a user with a notification that is perceptible to the user, in order to indicate that the system information to be provided has now been completely received. This notification can be provided haptically, acoustically and/or visually. In some specific embodiments, the indication device is a device configured to output both a visual notification and an acoustic notification. Alternatively or additionally, the indication device may be configured to transmit the indication to the user terminal, wherein the user terminal is configured to output a corresponding notification.

In some embodiments, the system information comprises at least one of the following:

Data comprising information about at least one component of the fire protection system, and/or Data comprising information about a setting of the fire protection system, and/or Data comprising information about an operating state of the fire protection system.

As mentioned in the introduction, system information can be understood as all information about the fire protection system. In particular, the system information may comprise data comprising information about at least one hardware component of the fire protection system. The term component is to be understood broadly in this context and comprises both the individual peripheral devices of the fire alarm system, such as the various fire detectors, pumps, temperature gauges, circuit arrangements and the like, which can be identified as part of the system information by means of their serial numbers, for example, and the components of the central device, such as the individual modules, which can be inserted into the central device to perform certain activities. In the following, these hardware-related data are also referred to as "factory data".

Alternatively or additionally, the system information may comprise data comprising information about a setting of the fire protection system. This includes in particular the changeable parameters of the fire protection system and/or the peripheral devices therein, which can be set and, if necessary, adjusted, for example, when configuring the fire protection system. Furthermore, these data may also comprise logic settings of the logic elements of the fire protection system. In the following, these data will also be referred to more generally as "operating data".

Alternatively or additionally, the system information may comprise data comprising information about an operating state of the fire protection system. These data, also referred to as "runtime data" or "state information", concern additional data that are generated during operation and allow conclusions to be drawn about the operating state of the fire protection system. Parameters of the state information are, for example, the pressure of a pump or the pressure in the pipe system, the power consumption of the central device, values indicative of the soiling of sensors, and/or temperature data and/or the like.

According to some embodiments, the computing device is further configured to check the at least one user input and, in response to the checking, generate a check indication for transmission to the user terminal.

In some embodiments, the computing device of the service device is configured to check and validate the user input made in response to the displayed system information. In particular, the computing device is configured to check during validation whether the user input is valid. In some embodiments, a check to determine whether the user input is valid is understood to be a check to determine whether the user input relates to an aspect that the user providing the user input has access to and is allowed to influence. For example, the installer of the fire protection system typically has more aspects for which he can provide user input than the end user.

However, a check of the validity of the user input can also be understood as a check of whether the input is valid in terms of its content. For example, in some embodiments, the user may change the changeable parameters by means of user input, wherein the changes are inconsistent with limits that may have been specified. In this case, the computing device, by checking, can prevent that the parameters are adjusted based on user input that is invalid for the fire protection system.

In the case of valid user input, the service device may cause the user terminal to output a positive indication to the user, comprising in particular a confirmation that the system information has been adjusted. In the event of invalid user input, the service device may cause an indication to be output that the user input is invalid and/or an indication that the changes have not been made. Further indications are conceivable.

In some embodiments, receiving the at least one user input comprises authenticating the user terminal. In some embodiments, the computing device is further configured to determine an access authorization of the user terminal, and/or to filter the system information transmitted to the user terminal based on the access authorization.

It may be advantageous for the service device to receive information about which access rights the user terminal has to the central device and/or the server component. For this purpose, the service device preferably comprises an authentication device as part of the computing device, which authentication device is configured to authenticate the central device and/or the server component upon receiving the system information. This allows the user to check whether the system information has been correctly and completely transmitted from the correct central device and/or server component.

Alternatively or additionally, the authentication device may be configured to check the validity of a license and, based on this check, to decide on the access of the user terminal to the service device and/or the server component. Access may be denied if the license has expired and allowed if the license has not expired or has been renewed. In this case, the central device in particular may be configured to automatically recognize the service device and to provide it with all system information upon the first communication link being established. The authentication device is further configured to request a license key from the user terminal upon the second communication device being established. In response to this request, the user terminal transmits its license key via the second communication link. The license key is then checked by the authentication device. If the license key is valid, the user terminal is granted access to the service device. If it is not valid, access is denied. This denial may comprise a notification that the license key is not (or no longer) valid and may need to be renewed.

In some embodiments, an external server provides the license key to the user terminal. For this, the user must connect to the external server and request the license key. The license key may be provided permanently or for a limited time. In the second case, the license key must be extended and/or renewed after a certain period of time. In some embodiments, this period is between one year and one day, in particular between 100 days and one day, in particular 30 days. The external server may be provided in particular by the installer of the fire protection system and/or the server component. In some embodiments, the external server may also be provided as part of the server component, in which case the user terminal has limited access to the server component without a valid license key.

In some embodiments, the authentication of the user terminal may be used not only to enable or prevent access, but also to determine the scope of the user's access. In these embodiments, the computing device is particularly configured to determine the user's access rights based on the authentication performed by the authentication device and to then filter the system information in dependence on the access rights. Thus, only certain system information is displayed to certain users. On the one hand, this has the advantage that the user is not flooded with unnecessary information, so to speak, and on the other hand, it can prevent an unauthorized user from gaining insight into, for example, the configuration data and logic settings of the fire protection system.

In another embodiment, the communication device is configured to communicate with the fire protection system via the first bidirectional communication link to receive from the fire protection system state information indicative of a state of the fire protection system, wherein the computing device is configured to retrieve one or more calibration values for state information from the memory unit, to evaluate one or more values of state information based on a comparison with the one or more calibration values for state information, and to generate at least one state indication for the fire protection system based on the evaluation.

In this embodiment, the service device receives, via the communication link with the fire protection system, in particular the central device of the fire protection system, state information indicative of the state of the fire protection system.

The state information allows in particular conclusions to be drawn about the state of the fire protection system, especially about the state of the components of a central device located therein, such as the modules, and/or peripheral devices. The term state information is understood to mean in particular the general data that allow a statement to be made as to whether a peripheral device is still functioning properly.

Alternatively or additionally, state information may also concern information about the state of a central device and/or the components of the central device, such as the current power consumption of the central device or of an individual module therein, the battery charge state (determined via the battery resistance) of a battery in the central device, and the like.

This state information can be evaluated in particular by the computing device. The computing device may be configured to generate a state indication on the basis of this evaluation.

For this purpose, the computing device is configured to retrieve one or more calibration values from a memory. This memory can be designed as an internal memory device of the service device in which memory the calibration values have been stored. Alternatively or additionally, the service device can also be configured to retrieve the calibration values from an external memory, for example via the communication device, which then forwards the calibration values to the computing device. The external memory can in particular be configured as part of a server component, wherein the communication device is configured to access the external memory via a network. In other embodiments, the external memory can also be implemented as an external database that connects directly to the service device, either wirelessly or by cable.

The term calibration values is understood to mean in particular target values for the individual parameters contained in the state information. Thus, the calibration values relate to the values that should be present for the respective state information, so as to determine that the peripheral devices—and thus the fire protection system—are functioning as specified. If the calibration values deviate from the determined values, it can be concluded that problems and/or malfunctions have occurred in one or more of the peripheral devices within the fire protection system.

The calibration values can be determined theoretically or empirically. This means that the calibration values can either be determined by calculation and written to the memory as target values, or they can comprise the actual values determined for the system and/or the fire protection system in the past, which are stored in the memory as calibration values. This means that if it has been determined in the past that the system and/or fire protection system is functioning, it can be assumed that the values present at that time are suitable as calibration values indicative of a functioning system.

In particular, the computing device uses the calibration values to evaluate the state information contained in the system information, wherein such evaluation is based on comparing the actually determined values of the parameters of the state information with the calibration values. This means that the computing device is configured to compare the extent to which the current actual value deviates from the target value and to output a corresponding state indication that allows a statement to be made about the state of the fire protection system. The state indication is configured to indicate whether the fire protection system is functioning without faults, or whether faults and/or malfunctions can be determined for certain components. The state indication can be output in particular to a user.

In some embodiments, the communication device is further configured to communicate with the central device of the fire protection system via the first bidirectional communication link, wherein the central device is in communicative connection with at least one peripheral device of the fire protection system.

The central device may further be configured to communicate with at least one peripheral device of the fire protection system. For this purpose, the central device can communicate with the peripheral devices either by means of the central communication device, which is also used for communication with the service device, and/or by means of a central peripheral device within the central device, which central peripheral device is configured specifically for communication with the peripheral devices. In the second case, the central peripheral device should be configured to communicate with the central communication device in order to transmit the information received from the peripheral devices to the service device.

In this context, the term peripheral device is understood to mean any type of sensor, detector, annunciator (hazard detectors, fire detectors), alarm transmitter, emergency call device, or actuator, control and switching device for controlling or switching off devices such as extinguishing systems or air conditioning systems. In this context, fire detectors may be automatic fire detectors, such as smoke detectors, heat detectors, flame detectors, spark detectors, fire gas detectors or smoke aspiration systems. Fire detectors can also be designed as manual fire detectors.

According to the invention, in particular the following peripheral devices are provided:

Fire detectors, such as automatic fire detectors or manual fire detectors, as well as hazard detectors for the recording of incident reports, fire alarms and faults, and/or Limit switches that serve to detect the position of, for example, ball valves, slide gates, butterfly valves, or the like, and/or Pressure switches, and/or Float switches for level measurements in pressurized water tanks in particular, in unpressurized water tanks and/or in other extinguishing fluid storage tanks, and/or Temperature switches, for example for monitoring the ambient temperature within the fire alarm system and/or the fire protection system; and/or Pump pressure switches, which are used, for example, to start pump motors in the event of a pressure drop in the pipeline network conducting the extinguishing fluid and/or in a fitting; and/or Gas sensors; and/or Actuators, such as horns, flashing lights, valves or the like.

This communication link between the central device and the service device and between the central device and the peripheral devices makes it possible, on the one hand, to transmit state information indicative of the state of the central device to the service device and, on the other hand, to transmit state information indicative of the state of the peripheral devices to the service device. This allows a comprehensive evaluation of the state information and thus a particularly accurate assessment of the state of the fire protection system.

In some embodiments, comparing one or more values of the state information with one or more calibration values comprises determining a threshold value for a deviation, wherein the computing device is further configured to generate a deviation indication when the threshold value is exceeded or not reached, and to integrate the deviation indication in the state indication. In one modification, the computing device is configured to output a maintenance indication in response to the deviation indication.

The target values of the fire protection system are usually not limited exactly to a single value, but move within a range that is limited upward and downward by corresponding upper and lower threshold values. These threshold values can be determined by guideline specifications. Alternatively or additionally, they can be determined computationally or empirically.

In some embodiments, these upper and lower threshold values are stored in the memory unit. The computing device of the service device is configured to read these threshold values and to determine which threshold values are to be used for which parameter within the state information. The computing device is furthermore configured to determine the value of the respective parameter within the state information and to compare it with the upper and lower threshold value. If the value of the parameter remains within the thresholds, the computing device determines that at this point everything complies with the specifications. However, if the value exceeds the upper threshold value or does not reach the lower threshold value, the computing device determines that there is a deviation from the norm. In this case, the computing device is configured to generate a deviation indication. The deviation indication thus indicates that there is a deviation for a certain value, i.e. that the value is no longer within the specified range. This deviation indication can then be output haptically, graphically and/or auditorily. In some embodiments, the deviation indication is in particular implemented as an alarm.

In some embodiments, in particular in the case of a graphical output of the deviation indication, this comprises a notification that states which value—or values—s affected by the deviation and whether the threshold value has been exceeded or not reached. In some embodiments, the deviation indication further already comprises a notification of what the cause of the deviation may be.

In some embodiments, the computing device is further configured to also output a maintenance indication in response to the deviation indication, i.e. a notification that maintenance of the fire protection system is required. In this case, the computing device can output the maintenance indication to the central device in particular and thus cause the communication device to transmit the maintenance indication to the central communication device. Alternatively or additionally, the computing device may output the maintenance indication to a user terminal and thus cause the communication device to transmit the maintenance indication to the user terminal. The user terminal preferably comprises a graphical user interface on which a graphical representation of the maintenance indication can be displayed.

This allows permanent monitoring of the fire protection system without the need for user interaction. The user is only informed when the system automatically detects a potential fault or malfunction.

In some embodiments, the communication device is further configured to communicate the state indication to the user terminal via the second bidirectional communication link.

The service device may further be configured to transmit, by means of its communication device, the state indication generated by the computing device to the user terminal via the bidirectional communication link with the user terminal. The state indication can then be displayed to the user on the user terminal. In some embodiments, transmitting the state indication further comprises transmitting the state information, wherein the state information may be filtered, depending on the authorization of the user, such that not all state information is transmitted. The user terminal is in particular configured to generate a graphical representation of the state indication and to display this graphical representation to a user.

In some embodiments, the computing device is further configured to store the state information in the memory unit.

It is preferred that the computing device is configured to store the state information obtained via the communication device in the internal or external memory unit following evaluation, if applicable together with the generated state indication and a corresponding time stamp. By storing the state information, in particular with a time stamp, it is possible to create a history for the state information—and thus a state history of the fire protection system—over a longer period of time. In this way, the long-term history of the values of the state information can be viewed. This can provide a prediction of the state of the fire protection system, especially of potential faults that may occur in the future.

In some embodiments, the computing device is further configured to also perform the evaluation of the state information based on user input.

It is preferred that the computing device is configured to take user input into account when evaluating the state information. In this case, user input can in particular be further information about the state, such as the information that a certain peripheral device has been exchanged, removed or added—and that different values are present now, for this reason. However, in other embodiments, the user input may also be a confirmation that the state information meets user expectations. For example, in some embodiments, the user may indicate that a peripheral device is to be replaced. The computing device will then include an appropriate notification in the state indication when the state indication is generated.

In some embodiments, the state information comprises at least one of the following:

Information indicative of the functionality of at least one detection unit of the fire protection system; and/or Information indicative of the state of closing elements of the fire protection system;

Information indicative of the state of switching elements of the fire protection system; and/or Information indicative of the state of the central device of the fire protection system.

The state information may in particular comprise parameters—or information—indicative of whether a detection unit is functional as a possible peripheral device of the fire protection system. Detection units typically comprise sensors to detect fire parameters. These sensors may become contaminated and/or destroyed over long periods of time. In a specific embodiment, the state information comprises one or more values indicating whether the detection units are still functioning reliably. This determination is preferably based on a comparison between the value of the state information as the actual value and a corresponding calibration value as the target value. In some embodiments, the actual values indicative of soiling can be stored for an extended period of time in order to monitor their development. This allows early detection of a shift in the value, especially towards the threshold value at which there is no longer any functionality.

The state information may further comprise parameters—or information—Indicating whether closing elements, such as shutters or the like, are functional as peripheral devices of the fire protection system and, if so, whether they are in the specified position. For example, a value of a parameter of the state information may indicate a degree of opening of a closing element. In a functioning fire protection system, each closing element must have a specific position that is coupled with a specific degree of opening. If the value of a closing element deviates from this specified degree of opening beyond certain tolerance limits, a fault can be assumed. Here, as well, it is possible to record the values over a long period of time in order to predict any trend for the individual closing elements and, if necessary, to replace them before the permissible tolerance limits are exceeded.

The state information can also comprise parameters that indicate in which switching position the switching elements of the fire protection system are currently located and/or whether there is, for example, a shift or deviation of the switching position of the individual switching elements. In a fire protection system, each switching element has a specified position for the non-triggered state. It must be checked whether this position is actually complied with. This is the only way to ensure that the fire protection system will function in the event of a fire. Here, as well, the switching position of the individual switching elements can be monitored over time in order to identify possible trends.

The state information may further comprise parameters indicating the state of the central device of the fire protection system and/or the components of the central device, such as corresponding modules. Such a parameter may be, for example, the power consumption of the central device and/or the resistance of an accumulator in the central device. If the value for power consumption and/or resistance changes, this may be a sign that the connected devices are malfunctioning. This is because such devices may have a higher or lower consumption and thus may represent an altered load. Preferably, the quiescent current of the central power supply, i.e. of the power supply unit, of the central device is determined and monitored over a longer period of time for the purpose of state monitoring by means of the above parameters. If the quiescent current shows a shift, such as an increase, it means either that certain components have been added to the fire protection system or that one or more components are malfunctioning. This, too, allows predicting a possible malfunction by observing the value development for a certain parameter within the state information over a longer period of time.

In some embodiments, the computing device is configured to receive at least one user identification from the at least one user terminal, and to authenticate the at least one user terminal based on the at least one user identification.

User identification in this context means any type of identification that can be used to identify the user terminal that is assigned to a particular user. For example, user identification may comprise a device identification number of the user terminal. In other embodiments, user identification may also comprise MAC identification or a unique identifier that has been generated based on, for example, the device identification and user ID. In other embodiments, a subscriber identity module (SIM) or an electronic subscriber identity module (eSIM) may be used to authenticate the user terminal—or, respectively, the corresponding user.

The term authentication is to be understood in this context as first identifying the user and then determining which authorization level the user has, i.e. which system information is to be provided to the user. This means that the authentication determines whether system information should be transmitted and, if so, which system information the user is allowed to receive.

On the one hand, this type of user identification and user authentication makes it possible to ensure that only authorized users have access to the relevant system information, but, on the other hand, it also allows to subdivide authorization levels known from prior art, i.e. to define more specific access authorizations. This allows implementation of individual and role-specific access rights for the fire protection system.

In some embodiments, the communication device of the service device is configured to transmit system information to the user terminal in response to authentication of the user terminal. The authentication performed by the computing device is thus preferably used to identify the user and to determine in this way which system information is to be transmitted in the present case and in which way such system information is to be processed. This enables user-specific provision of the relevant information.

In some embodiments, the service device further comprises an access restriction device configured to allow access by the at least one user terminal to the central device if the at least one user terminal can be authenticated and to prevent access if the at least one user terminal cannot be authenticated.

It is preferred that the service device comprises an access restriction device that is configured not only to appropriately restrict or allow viewing of the system information based on authentication—i.e. to provide only certain system information to certain users—but also to allow, restrict and/or completely prevent access to the central device of the fire protection system itself, in particular for configuring the same, for activating/deactivating certain functions and the like, based on the authentication. For example, authentication by the computing device of the service device may reveal that the user is an installer of the fire protection system. In this case, the user is granted unrestricted access to the central device and its configuration. If authentication reveals that the user is a controller, access can be restricted to the central device settings that need to be changed for maintenance performed by the controller. If, on the other hand, authentication reveals that the user is a customer, access to the central device can be completely prevented if it is not intended that the customer makes changes to the fire protection system.

In some embodiments, the service device further comprises a verification device, wherein the communication device is further configured to communicate with a server component via a third bidirectional communication link, and the verification device is configured to receive an access verification from the at least one user terminal and, in response to the access verification, to cause the communication device to establish the third bidirectional communication link. In a further development, the communication device is configured to transmit the system information to the at least one user terminal by means of the server component.

In some embodiments, the service device may be configured to further communicate with a server component, such as a cloud. For this purpose, the communication device of the service device is preferably configured to establish a further bidirectional communication link with a server communication device of the server component. Providing such a server component has the advantage that some of the functionality of the service device, such as storing system information in a memory, can be outsourced to the server component to reduce the capacity requirements of the service device. However, in some embodiments, storing the system information may be performed both in a memory device of the service component and in a data memory of the server component to be able to perform redundant storing of the relevant system information.

In any case, it is necessary to ensure that a user is authorized to use the server component. For this purpose, the service device comprises a verification device which is configured to verify that a user—identified by the user terminal—is allowed to use the server component. For this, the verification device is configured to obtain access verification from the user terminal. For this, the user terminal is configured to transmit the access verification to the communication device of the service device. The communication device then transmits the access verification to the verification device for verification of the user. In some embodiments, the user identification comprises or is equivalent to the access verification. In some embodiments, the access verification may also be a dedicated signal.

The verification device is configured to determine on the basis of the access verification whether the user is authorized to access the server component. If this is the case, the verification device enables the bidirectional communication link between the communication device of the service device and the server communication device of the server component so that the user can use the functionalities of the server component. If, on the other hand, the user does not have authorization, there is no enabling by the verification device and the unauthorized user cannot access the server component.

The verification device is thus configured to restrict access of the service device the user communicates with to the server component, in particular to prevent access if the user is not authorized to use the server component. In some embodiments, for authorization purposes, the user may particularly obtain a server license that allows the user to use the server component. In some embodiments, the server license is granted for a limited time. Alternatively or additionally, such server license may also be granted permanently.

In some embodiments, the service device and the user terminal may also be configured to communicate not exclusively by direct means, but alternatively or additionally via the server component, after verification of the user and the corresponding enabling of the communication link between the service device and the server component. In this case, the server communication device of the server component is in particular configured to establish a further bidirectional communication link to the user terminal. Communication between the service device and the user terminal can then be carried out directly and/or via the server component. In this context, communication via the server component has the advantage that the server component can take over a part of the functionalities of the service device without this significantly increasing the data volume to be transmitted.

In some embodiments, the at least one user identification comprises an identity module of the user terminal.

Preferably, the user terminal is a cell phone or a tablet. Such cell phones or tablets are usually equipped with an identity module, in particular a subscriber identity module (SIM) for a mobile network. The subscriber identity module makes it possible to identify the user terminal in the mobile network. This functionality can also be used for identification of the user by the service device. That is, the computing device of the service device is configured to identify the user by means of the (subscriber) identity module.

In some embodiments, the identity module, in particular the subscriber identity module, is configured as a programmable module. This allows software-based programming of the user identification.

In some embodiments, the service device further comprises an identification device configured to transmit identification data of the service device to the at least one user terminal.

It is preferred that the service device identifies itself to the user terminal. In some embodiments, the service device further comprises an identification device which is configured to transmit identification data to the user terminal for identification of the service device. In this embodiment, the communication of system information and the like via the bidirectional communication link between the communication device of the service device and the user terminal is in particular not permitted until both the user terminal has been authenticated by the service device and the service device has been authenticated by the user terminal, i.e., bidirectional identification has occurred. In some embodiments, the identification data is an identification number of the service device. This identification number can be processed by the identification device in particular in such a way that it can be used by the user terminal to identify the service device and then transmitted to the user terminal. One advantage of this is that it is possible to determine retrospectively which user terminals and which service devices were used in the system.

In some embodiments, as an alternative or in addition to the computing device, the identification device may also be configured to identify the user terminal based on user identification. In some embodiments, the identification device may be further configured to identify the central device and/or the server component. Other applications of the identification device are conceivable. This increases safety.

In some embodiments, the computing device is further configured to generate and store a state log in a memory unit on the basis of an evaluation of the system information comprising the state information.

Evaluating the system information comprising the state information may include, in particular, creating a state log. This state log makes it possible to determine whether the fire protection system complies with parameters specified by guidelines, such as approval and/or safety norms, which is to say, whether it is within the threshold values specified by guidelines. Here, it is provided that the state log is created in such a way that the system information is compiled for the respective user according to the user's assigned role.

For example, if the user is the installer, the state log may comprise, in particular, a log of those parameters of the system information that concern specific inspection activities specified by guidelines, i.e. a type of maintenance log. Alternatively or additionally, such a log may concern the comparison of actual and calibration values of changeable parameters of the fire protection system or operating parameters of the components located therein, such as peripheral devices or the like, and thus represent a kind of inspection log.

If the user is the controller, the state log may in particular include a summary of the previous inspection or maintenance logs to provide the controller with an overview of the amount of work to be performed during the next maintenance/repair. In some embodiments, based on the evaluation, the user may also be provided a state log which comprises a list of proposed materials needed for maintenance. In some embodiments, the state log may additionally comprise an evaluation result of the evaluation so that the user himself can check whether the list is complete.

If the user is an end user, the state log may comprise in particular the current actual state of the fire protection system, or, respectively, of the peripheral devices located therein. In some embodiments, the state log may comprise inspection logs and/or maintenance logs and/or maintenance reports. In this case, it is preferred that these logs comprise less detailed information than in the case of the installer, for example. Creating the state log may further comprise summarizing past values of one or more pieces of system information, particularly of the state information.

In some embodiments, the computing device is configured to generate an evaluation result on the basis of the evaluation of the state information, and the communication device is further configured to transmit the evaluation result, in particular together with the state information, to the data memory of the server component via the third bidirectional communication link, wherein the evaluation result is associated with a time stamp which indicates at which time the state information has been received.

In this context, an evaluation result is understood to be in particular a summary of the evaluation of the state information at a given point in time, namely the point in time at which this state information was received and evaluated. That is, the evaluation result comprises a result of the evaluation for each parameter in the state information that has been evaluated. In some embodiments, this may mean that the evaluation result for all parameters of the state information determines that their values are within the specifications. However, in some embodiments, the evaluation result may comprise one or more parameters of the state information whose values differ from the specifications. In this case, the evaluation result can state that the values for parameters a to c are within the specified range, but that this is not the case for parameters d and e. Alternatively or additionally, the evaluation result may further comprise a state indication that can be output to a user. The state indication is configured to indicate whether the fire protection system is functioning without faults or whether faults and/or malfunctions can be detected at certain locations. If, as mentioned above, the values of the parameters d and e are not within the specified range, the evaluation result can, for example, comprise a state indication which alerts a user to this deviation.

The evaluation result is preferably transmitted to the server component, wherein the data memory of the server component is configured to store the evaluation result. In order to be able to trace at which point in time an evaluation of the state information has produced the corresponding evaluation result, the evaluation result is provided with a time stamp that identifies the corresponding point in time. The evaluation result, associated with the time stamp, is then written to the data memory. Preferably, this process is repeated at regular intervals. This allows monitoring the development of the evaluation results over time. In this way, trends and developments in the fire protection system can be identified over a longer period of time and, if applicable, any faults and/or malfunctions that may develop can be predicted at an early stage.

In some embodiments, the state information is indicative of a state of at least one peripheral device of the fire protection system, wherein the evaluation result is further associated with a device index indicative of the respective peripheral device.

In some embodiments, the state information in particular comprises values for parameters indicative of the state of one or more peripheral devices. In this case, the evaluation result generated on the basis of this state information can, in addition to a time stamp, also be associated with at least one device index, wherein the device index indicates the respective peripheral device for which the state information was received. This means, specifically, that if the evaluation result comprises the state information of peripheral devices A and B, this evaluation result is associated with the device indices of peripheral devices A and B such that the evaluation result allows the result of the evaluation for peripheral device A to be uniquely assigned to peripheral device A, and the result of the evaluation for peripheral device B to be uniquely assigned to peripheral device B. In this way, the evaluation result provides a quick overview of the states of the individual peripheral devices. Furthermore, the additional use of the time stamp enables monitoring the development of each peripheral device over time using the evaluation results.

In some embodiments, the user terminal may in particular be used to select a specific peripheral device and to provide, from the time-stamped evaluation results, the results for that specific peripheral device as a function of time. This allows to make available the peripheral device-specific state, in particular in the form of a graphical representation.

In some embodiments, the computing device is configured to generate a state log of the fire protection system based on the state information and the time stamp. In a further development, the state log comprises one or more of a state indication, a deviation indication, and/or a maintenance indication.

The computing device of the service device is further configured to generate a state log. In the following, such a state log is understood to mean in particular a summary of the evaluation results in relation to time. This means that the time stamp associated with an evaluation result is used to represent the temporal course of the evaluation results over a longer period of time in summarized form.

In some embodiments, the device index associated with a corresponding peripheral device may also be included in generating the state log. For example, the device index can be used to create a filter to provide the temporal course of the results related to the state for a specific peripheral device by filtering the further results. In other embodiments, the device index may also be used to select, for example, two similar peripheral devices and generate a state log in which the states of the two peripheral devices are compared. Further indices, such as module identification numbers or similar, can be included in the generation of the state log, which indices make it possible to establish a filter specifically for these components and to filter the corresponding state information. This provides a simplified and clearer overview of the state of the fire protection system.

It is preferred that the state log is provided to the user. On the one hand, this can be done by the user terminal via the display device of the user terminal, which is configured, for example, to graphically display the state log. This allows the user to view the state log also remotely.

Alternatively or additionally, the state log can also be provided to the user via a central display device of a central device. The central display device may also be configured to generate a graphical representation of the state log and then display it. In this case, the user can view the state log on the central device.

In some embodiments, the state log further comprises the state indication, a deviation indication, and/or a maintenance indication.

The computing device of the service device may be configured to generate and output a state indication and/or a deviation indication and/or a maintenance indication based on the evaluation of the state information. It is preferred that the output is provided to a user of the fire protection system. The output can be haptic, graphic and/or auditory.

Here, the state indication concerns an indication of whether the fire protection system is functioning without faults or whether faults and/or malfunctions can be detected at certain locations. Thus, the state indication may be output when there is no fault and also when there is a fault. In some embodiments, the state indication is non-specific and merely indicates with a "yes/no" notification whether or not the fire protection system is functioning without faults. In some embodiments, however, the state indication may be more specific, indicating, for example, where a fault is suspected.

The deviation indication relates in particular to the situation in which it is determined during a comparison of the values for certain parameters of the state information that such values deviate from the calibration values to an extent that is no longer permissible. The comparison indication thus indicates that there is a deviation for a specific value and that the value is no longer within a specified interval and/or deviates from a specified specific calibration value. In some embodiments, the output of the deviation indication is preferably in the form of an alarm. In other embodiments, the output may comprise a graphical or auditory notification of which value—or values—is affected by the deviation and, if the deviation concerns a deviation outside the limits of a specified interval, whether a threshold value has been exceeded or not reached. In some embodiments, the deviation indication further already comprises a notification of what the cause of the deviation may be.

In some embodiments, the computing device is further configured to further output a maintenance indication in response to the deviation indication, i.e. a notification that maintenance of the fire protection system is required. In this case, the computing device can output the maintenance indication to the central device in particular and thus cause the communication device to transmit the maintenance indication to the central communication device. Alternatively or additionally, the computing device may output the maintenance indication to a user terminal, that means cause the communication device to transmit the maintenance indication to the user terminal. The user terminal preferably comprises a graphical user interface on which a graphical representation of the maintenance indication can be displayed.

It is preferred that the indications output, or a notification of the output of these indications, is stored in the data memory of the server component, so that it is still possible to trace in retrospect which indications were output by the service device. This storing is preferably also done with a corresponding time stamp. If a state log is now generated on the basis of the evaluation result and the time stamp, the notifications of the indications output, also associated with their corresponding time stamp, are inserted into the state log. Preferably, the notifications are integrated into the graphical representation of the state log so that the user can view them.

In some embodiments, the computing device is configured to receive a service path specification indicating an order in which the state information is to be evaluated and to evaluate the state information according to the service path specification.

It may be advantageous to check certain parameters in the state information before checking certain, further parameters, especially if there is a dependency between the individual parameters, for example, such that a deviation of a value of a first parameter from the norm would result in a deviation of a value of another parameter. In this case, in order to prevent a fault from remaining undetected—because a deviation has already been found elsewhere—and/or to prevent incorrect conclusions being drawn with regard to the functionality of the fire protection system (because a parameter under consideration deviates due to the deviation of another parameter from the norm, wherein the parameter under consideration has no influence on the fault), it makes sense to specify a "service path" in such a case, i.e. to specify the sequence in which the parameters in the state information are to be checked one after the other. This allows to identify the important parameters at an early stage and thus increases the efficiency of the evaluation.

In another aspect, the invention relates to a fire protection system comprising a central device, wherein the central device (200) is configured to be communicatively connected to a service device as described above.

In another aspect, the invention relates to a system for operating a fire protection system comprising at least one service device according to one of the embodiments described above, at least one central device comprising a central computing device, and at least one user terminal, wherein the service device is configured to communicate with the central computing device of the central device via the first communication link.

In a still further aspect, the invention relates to a system for operating a fire protection system comprising the service device, a central device, for example a central device of a fire alarm system, and at least one user terminal. The central device may comprise a central computing device. A central computing device can be understood to be in particular a computing device in the central device which is used to perform data processing in the central device.

In some preferred embodiments, the central computing device is particularly implemented as a central card that is integrated into or otherwise communicatively connected to the central device. In these cases, the first bidirectional communication link may preferably be established as a communication link between the central card and the service device. For this purpose, the service device can be connected to the central card either wirelessly or by means of a cable.

In one embodiment of the system, the service device is configured as an internal service module of the central device.

In some embodiments, the service device is implemented as a kind of box which can be externally connected to a central device, for example, via the central card.

In other embodiments, however, the service device may also be implemented as a module which is installed internally in the central device. The advantage of implementation as an internal module of the central device is in particular that the first bidirectional communication link between the central device and the service device runs internally and is thus better secured against unauthorized access.

According to another embodiment of the system, the central device comprises a central memory device for storing a second software identification indicative of the software data on the central device, wherein the at least one user terminal is configured to receive a request for transmission of software data from the service device and, in response to the request, to allow transmission of the software data from the service device to the central device, wherein the central device is further configured to receive the software data transmitted from the service device.

In some embodiments, the second software identification, which is indicative of the version of the software data currently installed on the central device and/or in one of the modules of the central device, is stored in a central memory device of the central device and, upon request of the service device, transmitted to the service device for comparing purposes. If the service device determines that the version of the software data indicated by the second software identification differs from the version indicated by the first software identification, the service device generates a corresponding request to the user terminal, asking for permission to transmit the current software data to the central device. The user terminal is preferably configured to output the request to a user. The user can then evaluate the request and confirm it, if applicable. In case the request is confirmed, the service device is configured to transmit the software data to the central device. The central device can then update its software data accordingly.

Alternatively or additionally, the service device can also transmit a request to the central device and, in response to such request being confirmed, initiate the transmission of the software data.

In one embodiment, the at least one user terminal comprises a graphical user interface, wherein the graphical user interface is configured to display a graphical representation of the system information.

Such a graphical user interface can be realized, in particular, in the form of a web interface that grants access to the individual aspects of the system information and allows, for example, to switch between these aspects. This allows the display to be designed in such a way that it is particularly clear for the user.

According to one embodiment, the system comprises at least one peripheral device of the fire protection system, wherein the system information is indicative of a state of the at least one peripheral device of the fire protection system, and wherein the service device is configured to generate at least one state indication of a state of the at least one peripheral device and/or the fire protection system on the basis of an evaluation of the system information.

A further aspect of the invention relates to a method for operating a fire protection system, in particular for maintaining and/or inspecting a fire protection system, the method comprising the following steps: Transmitting system information via a first bidirectional communication link from a central device of the fire protection system to a service device, processing of the system information by the service device, transmitting at least a part of the system information via a second bidirectional communication link to at least one user terminal to allow the user terminal to access at least part of the system information of the fire protection system, receiving at least one user input from the user terminal in response to the transmitted system information, and adjusting the system information of the fire protection system on the basis of the at least one user input.

According to one embodiment, the method further comprises: Receiving of system information from one or more peripheral devices of the fire protection system by the central device, wherein the system information is indicative of a current state of one or more peripheral devices of the fire protection system, evaluation of the system information by a computing device of the service device, and generating a state indication based on the evaluating. In a further development, the method further comprises: Transmitting the state indication from the service device to the at least one user terminal and outputting, by the at least one user terminal, the state indication to a user.

The method according to the invention makes use of the advantages and preferred embodiments of the service device and system according to the invention. The preferred embodiments and further developments of the service device as well as of the system for operating a fire protection system are therefore at the same time preferred embodiments and further developments of the method, which is why reference is made to the above explanations in this respect.

BRIEF DESCRIPTION OF THE DRAWINGS

The invention is described in more detail below with reference to the attached figures and using preferred embodiment examples.

MODE(S) FOR CARRYING OUT THE INVENTION

Figure 1:
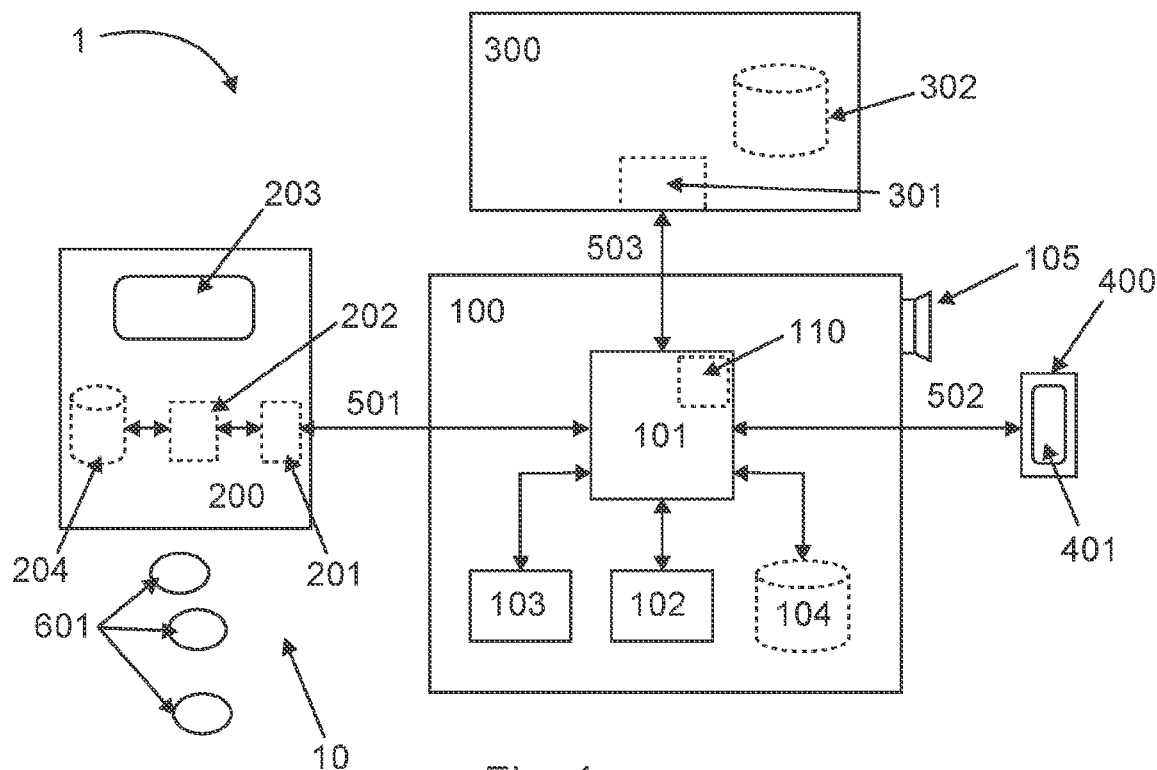
FIG. 1 shows a schematic representation of a system for operating a fire protection system of a first embodiment.

FIG. 1 shows a system 1 according to the invention for operating a fire protection system 10 comprising a service device 100, a central device 200 of the fire protection system 10, a server component 300 and a user terminal 400.

The service device 100 comprises a communication device 101, a computing device 102, an identification device 103, a memory device 104 and an indication device 105. The computing device 102 further comprises an authentication device 110.

The fire protection system 10 comprises a central device 200 and a plurality of peripheral devices 601 which are communicatively connected to the central device 200 (not shown). Although only three peripheral devices 601 are shown in the schematic representation of FIG. 1, the fire protection system 10 may comprise more or fewer peripheral devices 601.

The central device 200 comprises a central communication device 201, a central computing device 202, a central display device 203, and a central memory device 204. The central communication device 201 is communicatively connected to the communication device 101 of the service device 100 via a bidirectional communication link 501. The central communication device 201 is further connected to the central computing device 202 and the central memory device 204 via a communicative link located in the central device 200. Through this, system information stored in the central memory device 204 can be transmitted to the service device 100. In some embodiments, the central computing device 202 is configured to process system information on its part and only then transmit it to the service device 100. Alternatively or additionally, the central computing device 202 can also be configured, on the one hand, to transmit system information directly to the service device 100 without processing, on the other hand, to process the system information for display on the central display device 203 and to transmit such information to the central display device for display thereon.

The service device 100 is configured to receive the system information via the bidirectional communication link 501. To this end, the communication device 101 first establishes the bidirectional communication link 501 to the central communication device 201. The communication device 101 receives an identification number for identifying the service device 100 from the identification device 103 and transmits it to the central communication device 201, which in turn transmits it to the central computing device 202. The central computing device 202 uses the identification number to identify the service device and, in response to the identification, provides system information that is (temporarily) stored in the central memory device. This information is then transmitted to the communication device 101 via the central communication device 201. The communication device 101 registers when the transmission is complete. This causes the indication device 105 to output a corresponding indication of the complete transmission of the system information. In the specific example of FIG. 1, the indication is visual indication as well as acoustic indication.

The communication device 101 then forwards the system information received to the computing device 102. In the specific embodiment of FIG. 1, this system information particularly comprises state information, i.e. data indicative of the (operating) state of the fire protection system 10 and the components and/or peripheral devices 601 located therein. This state information is generated in particular during operation of the fire protection system 10.

The computing device 102 is configured to process this system information comprising the state information for transmission to the user terminal 400. For this purpose, the communication device 101 is configured to communicate with a server communication device 301 of the server component 300 via a bidirectional communication link 503 to access the data memory 302 of the server component 300. In the specific embodiment of FIG. 1, the data memory 302 comprises a set of target values as calibration values for the values of the corresponding parameters in the state information. The computing device 102 is configured to read these target values from the data memory 302, in particular to retrieve them via the bidirectional communication link 503, and to evaluate the runtime data on the basis of the target values. The computing device 102 is further configured to transmit the accordingly processed system information, optionally together with an evaluation result and/or a state indication, to the user terminal 400 via a bidirectional communication link 502.

In some embodiments, the user terminal 400 is first authenticated upon establishing the bidirectional communication link 502 between the service device 100 and the user terminal 400. For this purpose, the computing device 101 comprises an authentication device 110. In the exemplary embodiment according to FIG. 1, authenticating the user terminal 400 particularly comprises verification that the user of the user terminal 400 has a valid license key. After the communication link 502 is established, the authentication device 110 transmits a request for a license key. In response to the request, the user terminal 400 transmits, preferably via the communication link 502, a corresponding license key, which is then checked by the authentication device 110. If the license key check result is positive, i.e. in the case of a valid license key, the authentication device 110 outputs a positive authentication indication and communication is enabled. If the license key check result is negative, i.e. if the license key is not valid (anymore), the authentication device 110 issues a negative authentication indication and the user is not granted access to the service device and thus to the system information it provides. The negative authentication indication may be displayed to the user on the user terminal, prompting the user to request a new license key and/or renew the license key. This ensures that the user can only access the system information with a valid license.

The user terminal 400 comprises a graphical user interface 401 which allows a user to view the processed system information and, in response to such information, make at least one user input. For example, in the specific embodiment of FIG. 1, the user is notified, based on the evaluation of the state information in the system information, that a pump within the fire protection system 10 is no longer operating at sufficient pressure. This notification may preferably be communicated to the user in the form of a state indication comprising a deviation indication provided to the user. Optionally, the user also receives a maintenance indication that the pump needs to be repaired or replaced. Further, the user who received the maintenance indication on their user terminal 400 may optionally provide a user input confirming that the maintenance indication was received and, if applicable, indicating that the potential issue with the pump will now be addressed by appropriate maintenance or inspection.

The transmitted system information is then adjusted based on this user input. In particular, it is stored that the user was informed about the possible fault of the pump and, if applicable, which measures should be taken. These additionally entered annotations are then saved as part of the adjusted system information. In the embodiment of FIG. 1, such information is stored preferably in the data memory 302 of the server component 300. However, in other embodiments, such information may be stored in a memory device 104 located on the service device 100. However, storage in the data memory 302 of the server component 300 is advantageous because, firstly, this can relieve the memory device 104 located in the service device 100 and, secondly, such storage allows the use of a service device other than the service device 100. Thus, even in the event of a malfunction of the service device 100, all data related to the fire protection system 10 can be accessed immediately. Lastly, storage in the data memory 302 of the server component 300 is also advantageous in that, for example, the operator of the server component 300, who may be, inter alia, the installer of the fire protection system 10, can access the server component directly, that is, without a service device 100, in order to perform further evaluation of the data.

In the embodiment according to FIG. 1, the system 1 for operating the fire protection system 10 comprises a service device 100 configured to communicate directly with the central device 200, the server component 300, and the user terminal 400, respectively, via the communication device 101. Although not shown, the central communication device 201, the communication device 101 and the server communication device 301 each comprise a cryptography device for encrypting the data exchanged between the communication devices. This allows a more secure data transfer.

Figure 2:
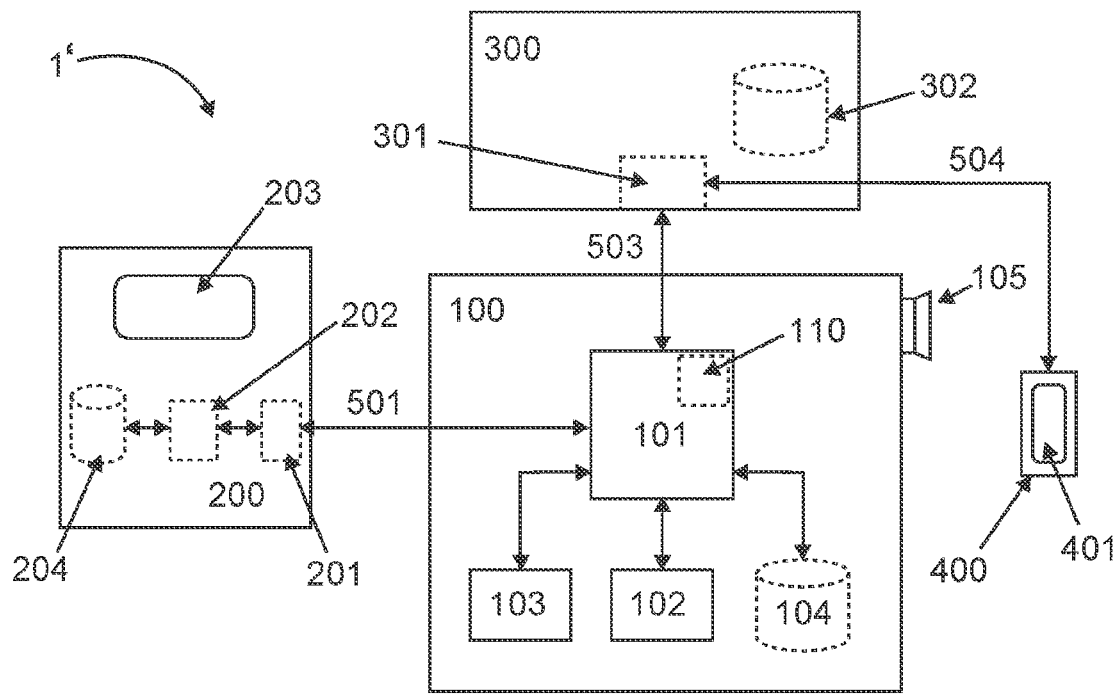
FIG. 2 shows a schematic representation of a system for operating a fire protection system according to a modification of the first embodiment.

FIG. 2 shows a system 1' for operating a fire protection system 10 according to a modification of the first embodiment of FIG. 1. In this case, as well, the system 1' comprises a service device 100, a central device 200, a server component 300, and a user terminal 400, all of which function as described in connection with FIG. 1, provided that like reference numbers denote like components. Since these functionalities correspond to those of the design according to FIG. 1, no further detailed description is given here.

Therefore, in the following, we will discuss only the differences between system 1 according to FIG. 1 and system 1' according to the modification in FIG. 2. In the specific embodiment of FIG. 2, the communication device 101 of the service device 100 communicates with the user terminal 400 via the server component. This means instead of direct communication via the bidirectional communication link 502 between the service device 100 and the user terminal 400, communication is established via the server component 300. To this end, the service device 100 communicates with the server component via the bidirectional communication link 503, and the server component communicates with the user terminal via the bidirectional communication link 504. That is, the communication link between the service device 100 and the user terminal 400 is formed by the communication link 503 and the communication link 504. This enables the provision of some, partly optional functionalities, such as the storage of system information and/or the identification of the user from the service device 100 to the server component 300, thus resulting in a reduction in system requirements for the service device 100.

Even though the service device 100 is drawn as an external component in the systems 1 and 1' according to the embodiments of FIG. 1 and FIG. 2, it should be mentioned here that the service device 100 can also be arranged as an internal module of the central device 200 without having to adapt the described functionalities. Thus, the service device 100 according to the invention may be implemented either as an internal (pluggable) module of the central device 200 or as a connectable, external element.

Figure 3:
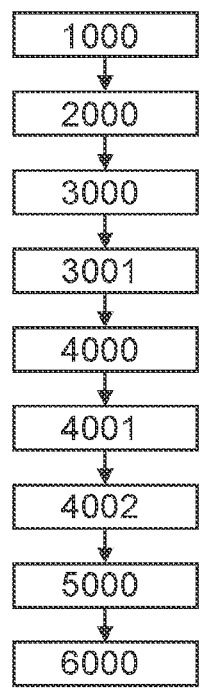
FIG. 3 shows a flow chart of a method for maintaining and/or inspecting a fire protection system according to one embodiment.

FIG. 3 schematically shows a flow chart of a method according to the invention for operating a fire protection system 10, in particular for maintaining and/or inspecting a fire protection system 10. In step 1000, the bidirectional communication link 501 is established between the communication device 101 of the service device 100 and the central communication device 201 of the central device 200. This setup optionally comprises identifying and/or authenticating the service device.

In step 2000, the communication device 101 of the service device receives the system information from the central communication device 201 of the central device 200 and, in step 3000, forwards it to the computing device 102. In step 3001, the computing device 102 processes the system information for transmission to the user terminal 400. In the specific embodiment of FIG. 3, the user of the user terminal is an installer and, accordingly, processing comprises evaluation of the system information as to whether all inspections of the system have been properly performed and confirm an existing operability of the system.

In step 4000, the processed system information is transmitted to the user terminal 400. In the specific embodiment of FIG. 3, transmitting first comprises establishing the bidirectional communication link between the service device 100 and the user terminal 400, and corresponding authenticating, as described in connection with FIG.

In step 4001, upon receiving the processed system information, the user terminal 400 generates a graphical representation of the system information and displays it to the user of the user terminal 400. In step 4002, the user makes at least one user input in response to the displayed system information. The user terminal 400 receives this user input and transmits it, optionally together with an association to the corresponding system information, to the communication device 101 of the service device 100.

In step 5000, the communication device 101 receives the user input and transmits it to the computing device 102, which adjusts the system information in step 600 based on the user input, and optionally writes the adjusted system information to a memory. In particular, this memory can be the memory device 104 of the service device and/or the data memory 302 of the server component.

Figure 4:
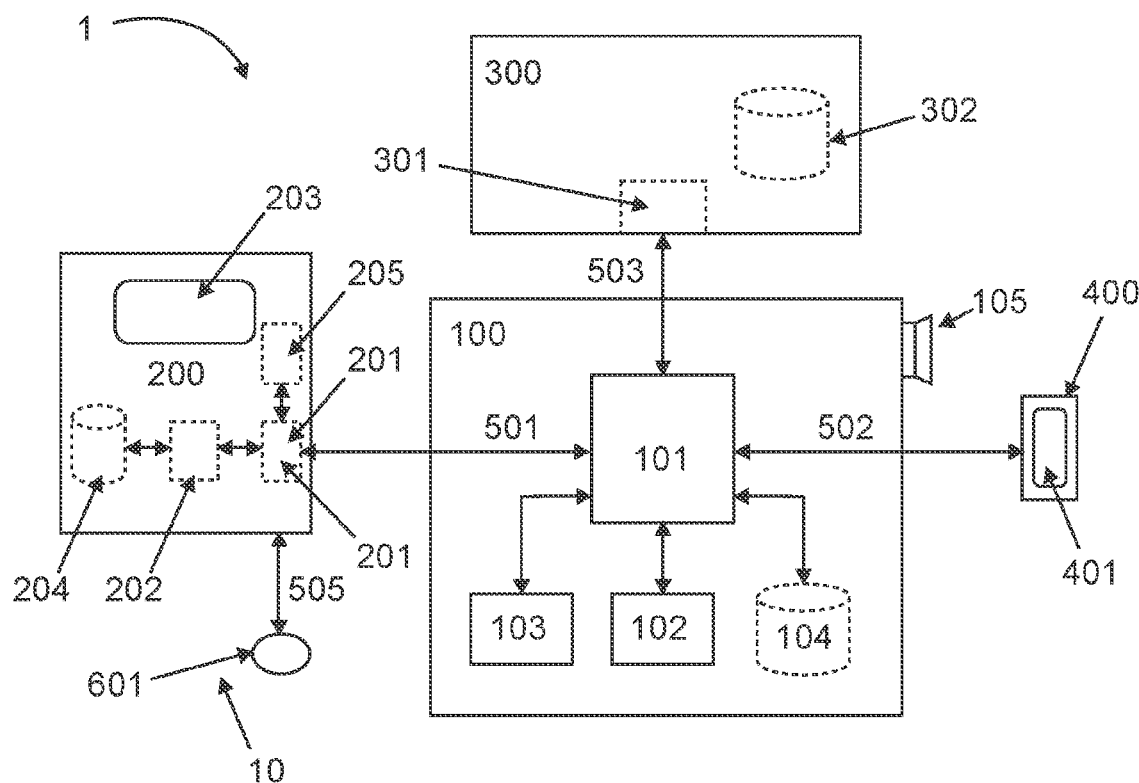
FIG. 4 shows a schematic representation of a system for operating a fire protection system according to a second embodiment.

FIG. 4 shows a system 1 according to the invention for operating a fire protection system 10 according to a second embodiment. The system 1 comprises a service device 100, a central device 200 of the fire protection system 10, a server component 300, and a user terminal 400.

The general system architecture of the system 1 according to the second embodiment corresponds to that of the system 1 according to the first embodiment as described in connection with FIG. 1. Here, as well, the service device 100 comprises a communication device 101, a computing device 102, an identification device 103, a memory device 104, and an indication device 105.

The fire protection system 10 comprises a central device 200 and a plurality of peripheral devices 601 which are communicatively connected to the central device 200 via a bidirectional communication link 505. Although only a single peripheral device 601 is shown in the schematic representation of FIG. 4, the fire protection system 10 may comprise more or fewer peripheral devices 601.

The central device 200 comprises a central communication device 201, a central computing device 202, a central display device 203, a central memory device 204, and, additionally, a central power supply 205.

The central communication device 201 is communicatively connected to the communication device 101 of the service device 100 via a bidirectional communication link 501. Within the central device 200, the central communication device 201 is connected to the central computing device 202 via a first communicative link, which in turn is connected to the central memory device 204, and is connected to the central power supply 205 via a second communicative link. This internal communication allows the central communication device 201 to collect state information about the state of the central device 200 for transmission, as part of the system information, to the communication device 101 of the service device via the bidirectional communication link 501. For example, this state information may be transmitted from the central power supply 205 to the central communication device 201 and may relate, for example, to the current power consumption of the central device 200 and/or a component thereof, such as a module, and/or the internal resistance of the accumulators within the central device 200 and/or the modules. It is possible to draw conclusions about defects within the fire protection system 10 on the basis of the current power consumption and/or the internal resistance.

Further, the central communication device 201 may be configured to receive state information indicative of the state of the peripheral devices 601. To this end, the peripheral devices 601 may be configured to communicate directly with the central communication device 201. Alternatively or additionally, to transmit the state information, the peripheral devices 601 may communicate with the central device 200 also via the central computing device 202 or a dedicated communication link. For example, this state information may relate to a degree of soiling of a sensor in a peripheral device 601, such as an annunciator.

The central communication device 201 is configured to transmit the state information as part of the system information to the communication device 101 of the service device 100 via the bidirectional communication link 501. To this end, the communication device 101 first establishes the bidirectional communication link 501, wherein the service device 100 can optionally identify itself to the central device 200, as described in connection with FIG. 1. In some embodiments, the bidirectional communication link 501 is maintained permanently after a one-time establishment, to transmit the system information, comprising the state information, from the central communication device 201 to the communication device 101. This allows permanent monitoring of the state of the fire protection system by monitoring and, optionally, evaluating state information by the service device 100 and/or the user terminal 400 connected thereto.

The communication device 101 forwards the state information to the computing device 102. In the specific embodiment of FIG. 4, the state information is, in particular, the current power consumption within the central device. The computing device 102 is configured to cause the communication device 101 to retrieve a calibration value (target value) for the power consumption from the data memory 302 of the server component 300 via a bidirectional communication link 503 with a server communication device 301 of the server component 300. Alternatively, the computing device 102 may be configured to retrieve the calibration value from the memory device 104 of the service device 100 if such a value is stored therein.

The computing device 102 thus obtains one or more calibration values indicative of past power consumption of the central device 200, and may use these calibration values to evaluate the value transmitted with the current state information. For example, the computing device 102 may detect an increase in power consumption and generate a corresponding state indication indicating that the power consumption of the central device 200 has increased. The user can then check whether the increase in power consumption is due to an addition of, for example, peripheral devices 601 to the fire protection system 10, or whether no peripheral devices 601 have been added and therefore the increase is due to other factors, such as an emerging defect.

In the specific embodiment of FIG. 4, the service device 100 is further configured to transmit the state indication to the user terminal 400 via the bidirectional communication link 502.

The user terminal 400 comprises a graphical user interface 401. The user terminal 400 is configured to generate a graphical representation of the state indication based on the state indication and display the graphical representation to the user on the graphical user interface 401. The user can thus also remotely detect a possible fault that has occurred or is still occurring and initiate appropriate countermeasures, such as repair or maintenance, replacement of components or similar.

For this, user actions for initiating countermeasures can be defined on a user- or role-dependent basis. For example, a customer at whose location the fire protection system 10 has been installed may initiate a countermeasure that comprises calling certified maintenance personnel. If the user is a controller in charge of maintenance, the controller can compile the materials for maintenance and/or repair in response to the state indication and accordingly plan and then initiate the maintenance and/or repair. If the user is the installer, for example, he can also plan and initiate the maintenance and/or repair himself or send appropriate certified maintenance personnel to perform the maintenance and/or repair. In any case, the state indication allows the user to act accordingly.

Figure 5:
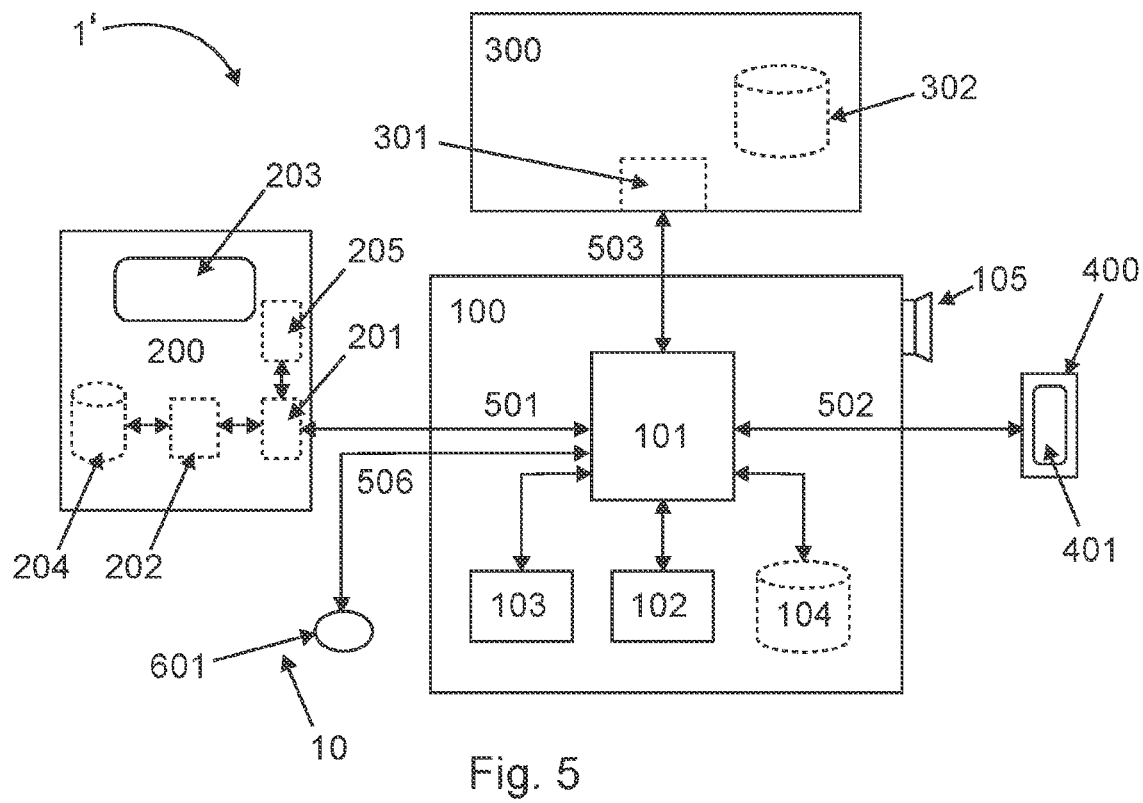
FIG. 5 shows a schematic representation of a system for operating a fire protection system according to a modification of the second embodiment.

FIG. 5 shows a system 1' for operating a fire protection system 10 according to a modification of the second embodiment of FIG. 4. In this case, as well, the system 1' comprises a service device 100, a central device 200, a server component 300, and a user terminal 400, all of which function as described in connection with FIG. 4, and like reference numbers denote like components. Therefore, we will again discuss only the differences between system 1 according to FIG. 1 and system 1' according to the modification in FIG. 5 in the following.

In the specific embodiment of FIG. 5, the communication device 101 of the service device 100 is configured to communicate directly with one or more peripheral devices via the bidirectional communication link 506. This means the communication device 101 of the service device 100 receives state information about the state of the central device via the bidirectional communication link 501 and state information about the state of the peripheral devices 601 via the bidirectional communication link 506. This enables a time-separated transmission of state information and thus allows a more efficient timing of the transmission. For example, state information indicative of the state of the central device 200 may be transmitted continuously and state information indicative of the state of the peripheral devices 601 may be transmitted only at regular time intervals, wherein the time intervals are selected, for example, depending on the requirements of the particular peripheral device 601 and/or the guidelines provided therefor.

In FIGS. 4 and 5, as well, the service device 100 is shown as an external component, but this can again be arranged as an internal module of the central device 200 without having to adapt the described functionalities.

Figure 6:
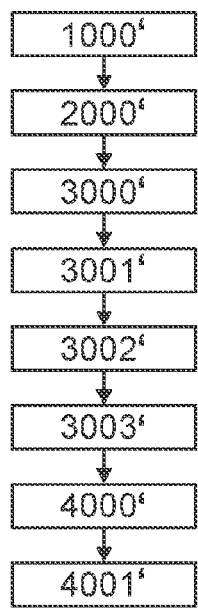
FIG. 6 shows a flowchart of a method for monitoring the state of a fire protection system according to one embodiment.

FIG. 6 schematically shows a flow chart of a method according to the invention for operating a fire protection system 10, in particular for monitoring the state of a fire protection system 10 according to FIG. 4. In step 1000', the bidirectional communication link 501 is established between the communication device 101 of the service device 100 and the central communication device 201 of the central device 200. In step 2000', the communication device 101 of the service device 100 receives the state information indicative of the state of the fire protection system 10 from the central communication device 201 of the central device 200 and, in step 3000', forwards it to the computing device 102. In step 3001', the computing device 102 causes the retrieval of the calibration values for the state information from a memory. For this purpose, the computing device 102 may in particular cause the communication device 101 to read these values from the data memory 302 of the server component.

In step 3002', the computing device 102 receives the calibration values and uses them to evaluate the state information. Based on this evaluation, which may in particular comprise a comparison of a value of a state information with the corresponding calibration value, the computing device 102 then generates a state indication in step 3003' and causes the communication device 101 to transmit this state indication, optionally together with the state information and/or the system information, to the user terminal 400 via the bidirectional communication link 502.

In step 4000', following receipt of the state indication, the user terminal generates and displays to the user of the user terminal a graphical representation of the state indication, optionally together with a graphical representation of the state information and/or the system information. In step 4001', the user initiates an appropriate action in response to the state indication if the state indication indicates such action is necessary to prevent a fault. This allows early fault detection and thus preventive maintenance and/or repair of the fire protection system.

Figure 7:
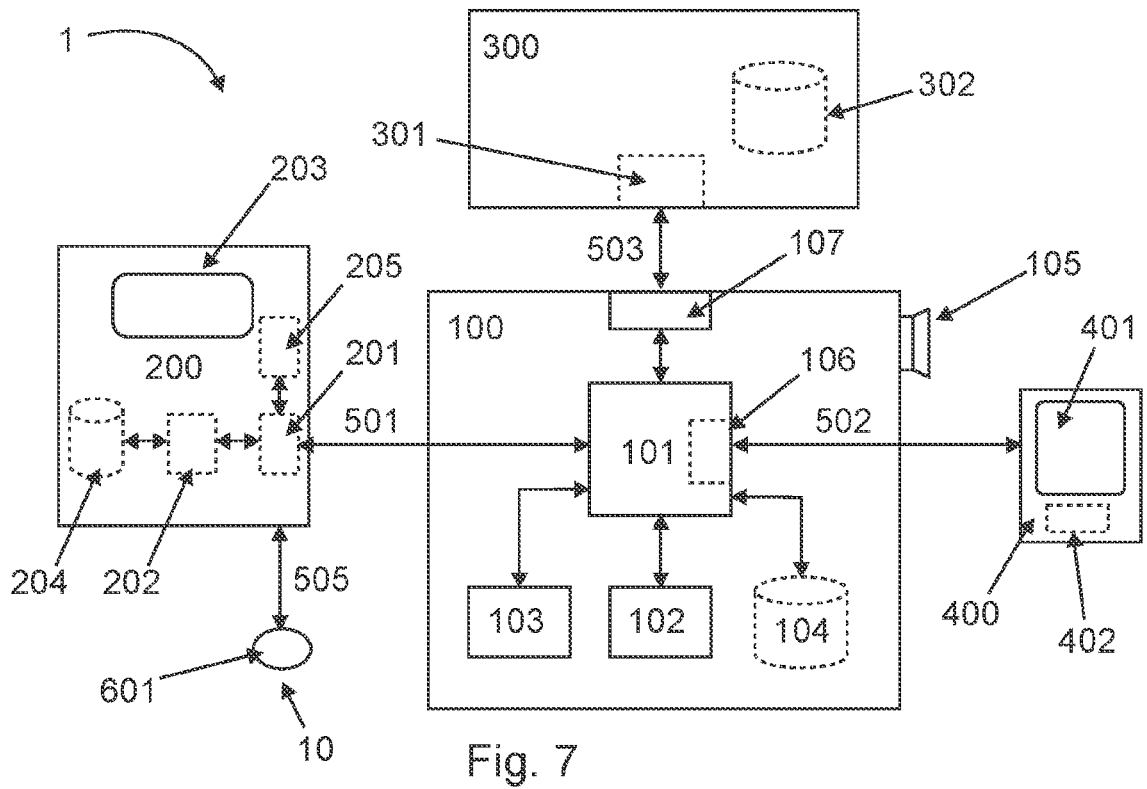
FIG. 7 shows a schematic representation of a system for operating a fire protection system according to a third embodiment.

FIG. 7 shows a system 1 according to the invention for operating a fire protection system 10 according to a third embodiment. Again, the system 1 comprises a service device 100, a central device 200 of the fire protection system 10, a server component 300, and a user terminal 400, and is thus similar in system architecture to the system according to the first and second embodiments.

The service device 100 comprises a communication device 101, a computing device 102, an identification device 103, a memory device 104 and an indication device 105. In comparison to the embodiments according to FIGS. 1, 2, 4, and 5, the service device 100 further comprises an access restriction device 106 and a verification device 107.

The user terminal 400 comprises a graphical user interface and an identity module 402, which is preferably designed as a subscriber identity module.

The fire protection system 10 and the server component 300 are substantially similar to the embodiments according to in FIG. 4. This means the fire protection system 10 comprises a central device 200 and a plurality of peripheral devices 601, of which again only one is shown in FIG. 7, wherein the peripheral devices 601 are communicatively connected to the central device 200 via a bidirectional communication link 505.

The communication device 101 of the service device 100 is configured to communicate with the central communication device 201 of the central device via a bidirectional communication link 501. The communication device 101 of the service device 100 is further configured to communicate with the user terminal 400 via a bidirectional communication link 502.

Unlike the first and second embodiments, in the third embodiment, the service device 100 comprises an access restriction device 106 configured to restrict the user's access to the information from the central communication device 201 via the bidirectional communication link 502, and in particular to prevent the transmission of system information to the user terminal 400 via the bidirectional communication link 502 until the user has been authenticated first.

This means in particular that the user terminal 400 only receives the system information from the fire protection system 10 via the service device 100 once the user has been successfully authenticated. In the specific embodiment of FIG. 7, an identity module 402 that outputs a user identification and transmits it to the computing device 101 of the service device 100 via the bidirectional communication link 502 is used for this authentication. For this purpose, the bidirectional communication link 502 is enabled to transmit the user identification.

The computing device 102 is configured to receive user identification, particularly from the identity module 402, and to determine whether such user identification can be matched to an authenticated user of the service device 100 and/or the fire protection system 10. If this is the case, the computing device 102, by outputting an enable signal, causes the access restriction device 106 to enable the bidirectional communication link 502 between the communication device 101 and the user terminal 400 also for transmission of system information and/or state information. In this case, the service device 100, or its communication device 101, then transmits the system information as described above to the user terminal 400.

However, if the user cannot be authenticated, the computing device 102 causes the access restriction device 106—either actively by transmitting an explicit signal or passively by not transmitting the enable signal—to maintain the access restriction. In this case, no system information can be transmitted from the service device 100 to the user terminal 400.

In FIG. 7, the service device 100 further comprises a verification device 107 configured to restrict access by the service device 100 to the server component 300, and in particular to prevent access if the user cannot be verified. This allows to check whether a user has authorization to access the server component 300 before accessing the server component 300. Such authorization may be understood to mean, in particular, a server license which the user must first acquire in order to use the server component 300. The user can use the additional capacity of the server component 300 only after purchasing the server license.

The verification device 107 is further configured to obtain access verification from the user terminal 400, in particular via the communication device 101. In some embodiments, access verification is arranged as part of the identity module 402. Alternatively or additionally, access verification can also be designed as a separate signal.

Based on this access verification, the verification device 107 determines whether the user is authorized to access the server component 300 via the bidirectional communication link 503. If this is the case, the verification device 107 enables the bidirectional communication link 503 so that it can be established. The user can then take advantage of the functionalities of the server component 300. If this is not the case, the verification device 107 prevents the enabling—and thus the establishment—of the bidirectional communication link 503. This allows to prevent an unauthorized user from accessing the server component 300.

Figure 8:
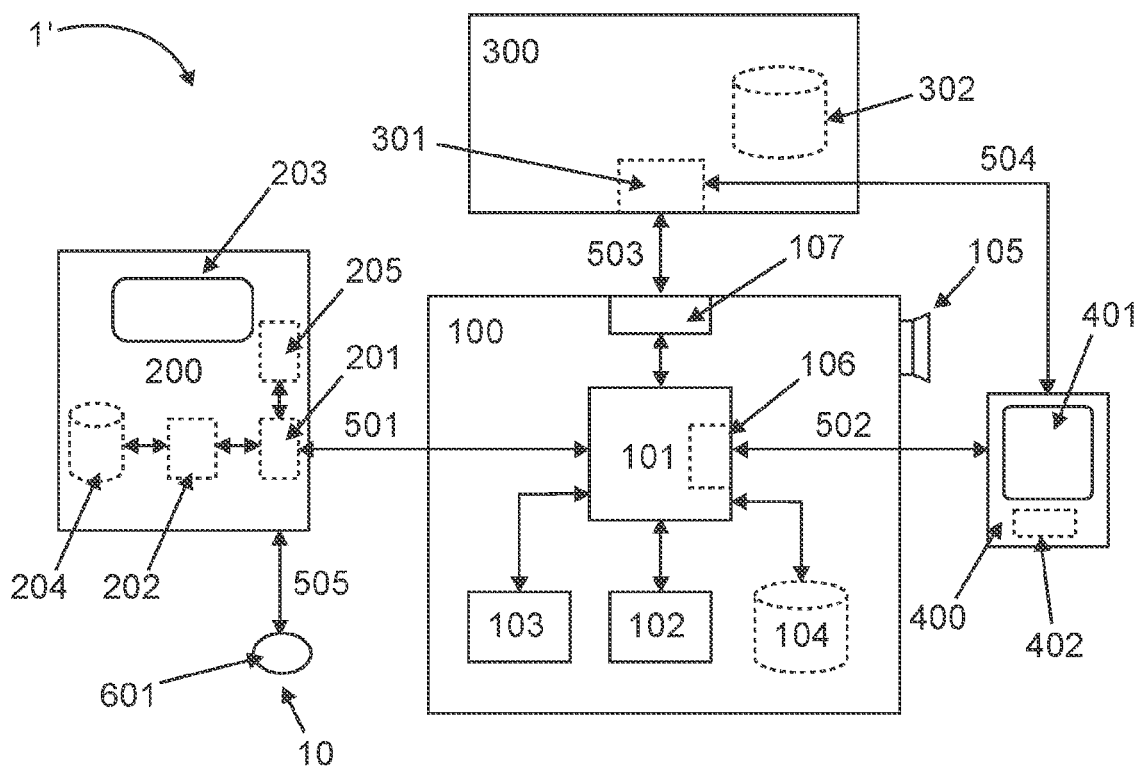
FIG. 8 shows a schematic representation of a system for operating a fire protection system according to a modification of the third embodiment.

FIG. 8 shows a system 1' for operating a fire protection system 10 according to a modification of the third embodiment of FIG. 7. In this case, as well, the system 1' comprises a service device 100, a central device 200, a server component 300, and a user terminal 400, all of which function as described in connection with FIG. 7, and like reference numbers denote like components. Therefore, we will again discuss only the differences between system 1 according to FIG. 1 and system 1' according to the modification in FIG. 8 in the following.

In the specific embodiment of FIG. 8, the communication device 101 of the service device 100 is configured to communicate with the user terminal, both directly, via the bidirectional communication link 502, and indirectly, via the server component 300, i.e. the bidirectional communication links 503 and 504. In the specific embodiment of FIG. 8, this means in particular that the bidirectional communication link 502 is used to transmit user identification from the user terminal 400, in particular its identity module 402, to the communication device 101, which transmits this user identification to the computing device 102. The computing device 102 authenticates the user terminal 400 as described in connection with FIG. 7.

If the user is identified as an authenticated user based on the user identification, the computing device 102 is configured to cause the access restriction device 106 to enable access by the user terminal 400 to the system information, as also described in connection with FIG. 7. In this case, enabling access means in particular enabling access of the user terminal to the system information transmitted via the bidirectional communication link 503 and the bidirectional communication link 504. This means in the embodiment according to FIG. 8, the system information is not transmitted via the bidirectional communication link 502, but via the bidirectional communication links 503 and 504, i.e. via the server component. On the one hand, this allows the user terminal 400 to be verified even without access to the server component 300, and on the other hand, this allows part of the processing and/or evaluation of the system information to be outsourced to the server component 300.

Even though, at this point, the service device 100 is again shown as an external component, the third embodiment according to FIGS. 7 and 8 can also be arranged as an internal module of the central device 200 without having to adapt the described functionalities.

Figure 9:
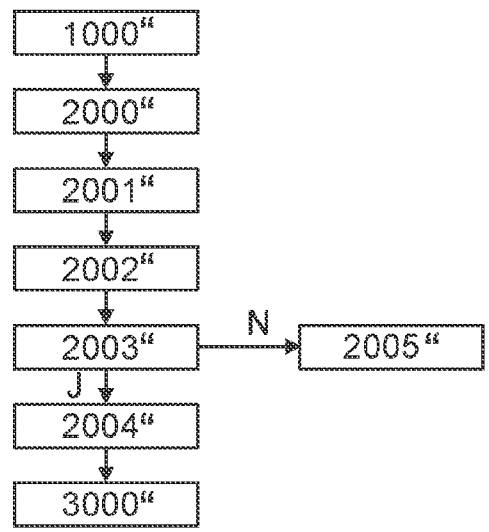
FIG. 9 shows a flowchart of a method for authenticating a user in a system for operating a fire protection system according to one embodiment.

FIG. 9 schematically shows a flow chart of a method according to the invention for operating a fire protection system 10, in particular for checking access to a fire protection system 10. In step 1000", the bidirectional communication link 501 is established between the communication device 101 of the service device 100 and the central communication device 201 of the central device 200. In step 2000", the bidirectional communication link 502 is established between the communication device 101 and the user terminal 400. To this end, in step 2001", the communication device 101 receives at least one user identification from the user terminal 400 and, in step 2002", transmits it to the computing device 102, which identifies the user based on the user identification and, in step 2003", determines whether the user is an authenticated user.

If this is the case ("J"), in step 2004", the computing device 102 outputs an enable signal to the access restriction device 106 that causes the access restriction device 106 to enable the communication of system information to the user terminal 400. In this case, in step 3000", the user terminal 400 receives the system information and/or state information that it is authorized to receive according to its access authorization—for example determined based on the authentication.

If this is not the case ("N"), then, in step 2005", the computing device 102 omits outputting the enable signal and no system information is output to the user terminal 400.

Figure 10:
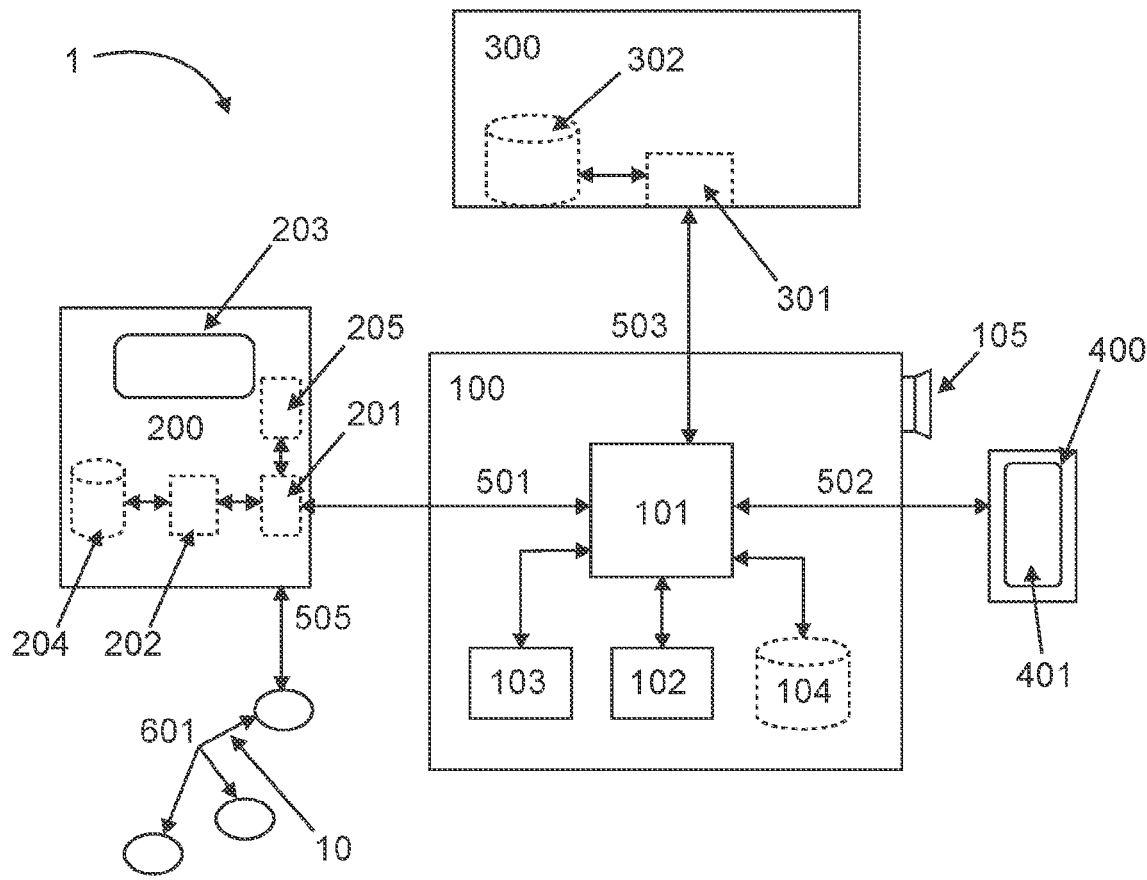
FIG. 10 shows a schematic representation of a system for operating a fire protection system according to a fourth embodiment.

FIG. 10 schematically shows a system 1 according to the invention for operating a fire protection system 10 according to a fourth embodiment, again comprising a service device 100, a central device 200 of the fire protection system 10, a server component 300 and a user terminal 400.

The service device 100 comprises a communication device 101, a computing device 102, an identification device 103, a memory device 104 and an indication device 105.

The fire protection system 10 comprises a central device 200 and a plurality of peripheral devices 601 which are communicatively connected to the central device 200 via a bidirectional communication link 505.

The communication device 101 of the service device 100 is configured to communicate with the central communication device 201 of the central device 200 via a bidirectional communication link 501 so as to obtain system information comprising state information indicative of the state of the fire protection system 10 and/or peripheral devices 601 located therein. The communication device 101 of the service device 100 is further configured to communicate with the server component 300 via a bidirectional communication link 503.

Thus, in the embodiment according to FIG. 10, the communication device 101 of the service device 100 receives at least one value for a parameter of the state information that is indicative of the state of the fire protection system 10 and/or one or more of the peripheral devices 601. The communication device 101 is configured to transmit the state information to the computing device 102, which is configured to evaluate the state information and generate an evaluation result based on the evaluation. In some embodiments, this evaluation result comprises further system information in addition to the evaluated state information.

The evaluation result is then transmitted via the bidirectional communication link 503 to the server component 300, where it is received by the server communication device 301 and then processed for insertion into the data memory 302. This processing can comprise in particular providing the evaluation result with a device index that indicates the respective component checked for its state, for example, a module of the central device 200, a peripheral device 601 of the fire protection system 10 or similar, as well as with a time stamp for better temporal traceability and increased protection against misuse.

This means in the system 1 of FIG. 10, the evaluation result, that is, the evaluated state information, optionally comprising the system information, is written to the data memory 302. In this way, a user, in particular the installer and/or certified maintenance personnel, can regularly inspect the system and understand whether all maintenance work has been carried out completely and on time. This allows the automated creation of maintenance logs. In an alternative embodiment, for example, in a case without access to the server component 300, the evaluation result and/or the system information may also be stored in the memory device 104 of the service device 100. This can eliminate the need for a server component 300.

In any case, a user can view the evaluation result by means of the user terminal 400—if applicable, after prior authentication. The user terminal 400 may in particular be configured to generate a graphical representation of the evaluation result and/or the maintenance log and to display it to the user. The user thus has an immediate overview of the current maintenance state of the system 1'.

Figure 11:
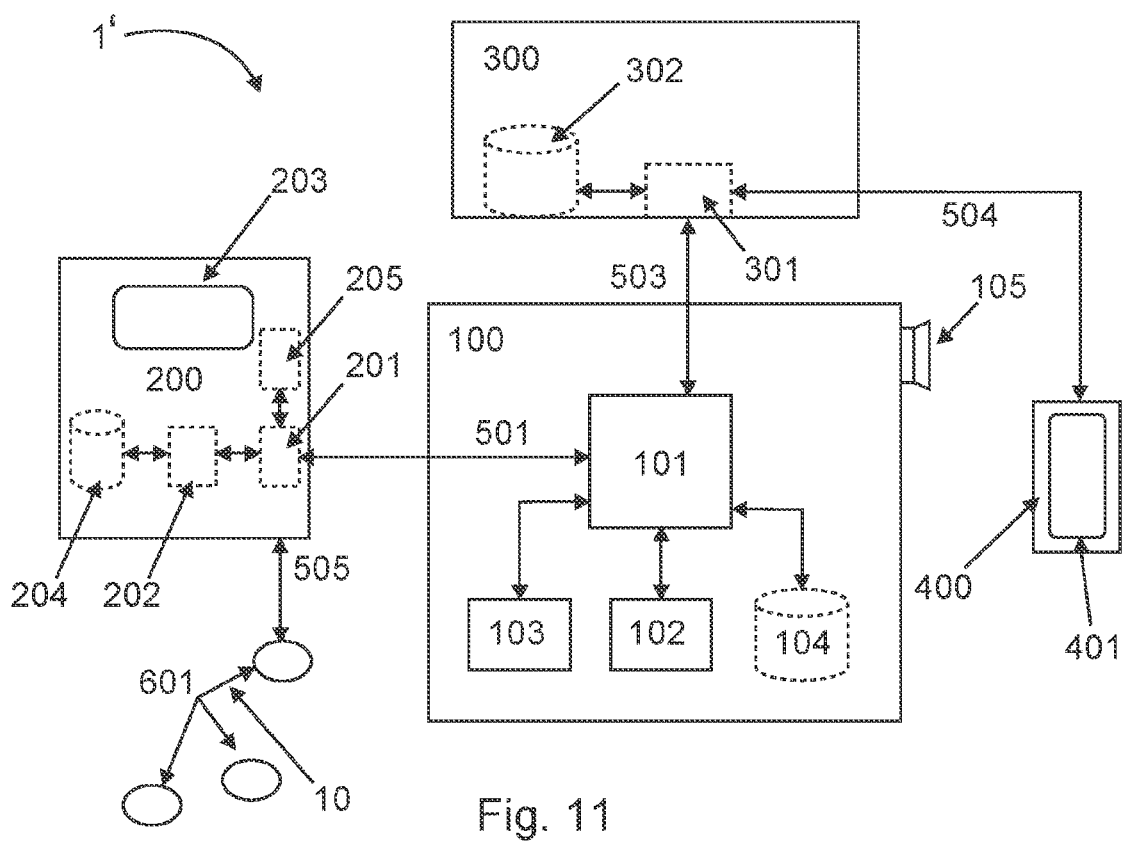
FIG. 11 shows a schematic representation of a system for operating a fire protection system according to a modification of the fourth embodiment.

FIG. 11 relates to a modification of the system 1 according to FIG. 10. Here again, identical reference numbers indicate identical components, the functionalities of which will not be discussed in detail below. The difference between the system 1 of FIG. and the system 1' of FIG. 11 is the way in which communication between the user terminal 400 and the service device 100 takes place. According to FIG. 10, the user terminal 400 communicates directly with the service device 100 or, respectively, the communication device 101, via the bidirectional communication link 502. Therefore, the user terminal 400 must access the evaluation result stored within the data memory 302 by means of the service device 100.

In contrast, in the system 1' of FIG. 11, the user terminal 400 communicates with the server component via the bidirectional communication link 504 to retrieve the evaluation result. In this embodiment, the communication—both to retrieve the evaluation result and to view the system information as described above—always takes place via the server component 300. This makes it possible to transfer certain evaluation and computing operations from the service device 100 to the server component 300, thus creating a service device 100 with low computing capacities.

Figure 12:
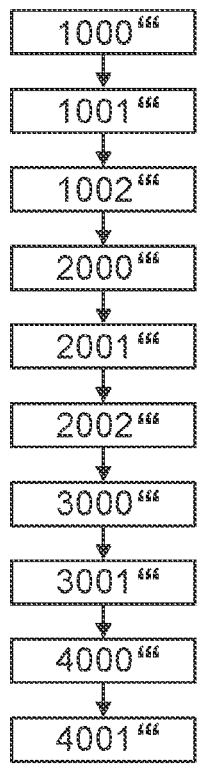
FIG. 12 shows a flowchart of a method for state monitoring of a fire protection system according to one embodiment.

FIG. 12 shows a schematic flow chart for a method of operating, in particular monitoring and maintaining, a fire protection system 10 in a system such as that shown in FIG. 10.

In step 1000''', the bidirectional communication link 501 is established between the communication device 101 of the service device 100 and the central communication device 201 of the central device 200. In step 1001''', the peripheral devices 601 transmit corresponding state information indicative of their state to the central device 200 via the bidirectional communication link 505. In step 1002''', the central communication device 201 transmits all of the system information, comprising state information indicative of the state of the peripheral devices 601 and/or the central device 200, to the communication device 101 of the service device 100 for further evaluation.

In step 2000''', the communication device 101 transmits the system information thus obtained to the computing device 102 for evaluation and for generating an evaluation result, and, optionally, a state indication, deviation indication, and/or maintenance indication. In step 2001''', the computing device 102 evaluates system information, in particular state information, and generates an evaluation result based on the evaluation. The computing device 102 is configured to then add to this evaluation result a device index indicating the corresponding component, for example the corresponding peripheral device 601, for which corresponding state information was available and for which it was therefore possible to determine the state based on an evaluation of this state information. The computing device 102 is further configured to add a time stamp to the evaluation result, indicating at what time the state information was received. In step 2002''', the evaluation result thus processed is then transmitted to the server component 300 by means of the communication device 101 via the bidirectional communication link 503.

In step 3000''', the server component 300 receives the evaluation result and transmits it, together with additional information such as the device index and the time stamp, to the data memory 302 in the server component 300. The evaluation result is stored there and can then be used for renewed evaluation—as a kind of actual value or historical value. In step 3001''', the server component 300 generates a state log before storing the evaluation result. In particular, this state log can be generated based on the state information as well as the device index and time stamp.

In step 4000''', the evaluation result and/or state log thus generated is then transmitted to the user terminal 400 via a bidirectional communication link. In step 4001''', the user terminal 400 creates a graphical representation of the evaluation result and/or state log and outputs it to the user by displaying the graphical representation on the graphical user interface. The user can then visually check whether maintenance has been carried out properly and what changes have occurred compared to the last cycle.

LIST OF UTILIZED REFERENCE NUMBERS

System for operating a fire protection system 1, 1'
Fire protection system 10
Service device 100
Communication device 101
Computing device 102
Identification device 103
Memory device 104
Indication device 105
Access restriction device 106
Verification device 107
Authentication device 110
Central device 200
Central communication device 201
Central processing device 202
Central display device 203
Central memory device 204
Central power supply 205
Server component 300
Server communication device 301
Data memory 302
User terminal 400
Graphical user interface 401
Identity module 402
Communication link 501, 502, 503, 504, 505, 506
Peripheral devices 601

The invention claimed is:

1. A service device for a fire protection system, comprising:
a communication device which is configured to communicate with a central device of the fire protection system via a first bidirectional communication link and to communicate with at least one user terminal via a second bidirectional communication link in order to grant the at least one user terminal access to at least a part of system information of the fire protection system; and
a memory device for storing the system information, wherein the memory device is configured to store a first software identification of software data, and
at least one computing device is configured to:

receive the system information from the central device and to process it for transmission to the at least one user terminal, receive at least one user input from the at least one user terminal in response to the system information, perform adjustment of the system information of the fire protection system based on the at least one user input, read, via the first communication link, a second software identification from the central device, such second software identification being indicative of the software data on the central device, compare the first software identification and the second software identification, and in response to determining that the first software identification and the second software identification differ, transmit the software data to the central device via the first communication link.

2. The service device of claim 1, wherein the computing device is further configured to:

recognize a difference between the system information stored in the memory device and the system information provided by the central device, and to adjust the system information in the memory device in response to this difference.

3. A service device according to claim 2, wherein the computing device is further configured to recognize the difference upon establishment of the first communication link between the central device and the service device.

4. A service device according to claim 1, wherein the computing device is further configured to determine an access authorization of the at least one user terminal, and to filter the system information transmitted to the at least one user terminal based on the access authorization.

5. A service device for a fire protection system, comprising:

a communication device which is configured to communicate with a central device of the fire protection system via a first bidirectional communication link and to communicate with at least one user terminal via a second bidirectional communication link in order to grant the at least one user terminal access to at least a part of system information of the fire protection system, a memory device for storing the system information, at least one computing device configured to:

receive the system information from the central device and to process it for transmission to the at least one user terminal, receive at least one user input from the at least one user terminal in response to the system information, perform adjustment of the system information of the fire protection system based on the at least one user input;

recognize a difference between the system information stored in the memory device and the system information provided by the central device, and adjust the system information in the memory device in response to this difference, and recognize the difference upon establishment of the first communication link between the central device and the service device.

6. A service device according to claim 5, wherein the memory device is further configured to store a first software identification of software data, wherein the computing device is further configured to:

read, via the first communication link, a second software identification from the central device, such second software identification being indicative of the software data on the central device, compare the first software identification and the second software identification, and in response to determining that the first software identification and the second software identification differ, to transmit the software data to the central device via the first communication link.

7. A service device according to claim 5, wherein the computing device is further configured to determine an access authorization of the at least one user terminal, and to filter the system information transmitted to the at least one user terminal based on the access authorization.

8. A service device for a fire protection system comprising:

a communication device which is configured to communicate with a central device of the fire protection system via a first bidirectional communication link and to communicate with at least one user terminal via a second bidirectional communication link in order to grant the at least one user terminal access to at least a part of system information of the fire protection system, and at least one computing device configured to:

receive the system information from the central device and to process it for transmission to the at least one user terminal, receive at least one user input from the at least one user terminal in response to the system information, perform adjustment of the system information of the fire protection system based on the at least one user input;

determine an access authorization of the at least one user terminal, and to filter the system information transmitted to the at least one user terminal based on the access authorization.

9. The service device according to claim 8, wherein the second bidirectional communication link is configured to connect the communication device to the at least one user terminal via a server component.

10. The service device according to claim 8, wherein the first communication link and/or the second communication link comprises an encrypted communication link.

11. The service device according to claim 8, further comprising an identification device configured to transmit identification data of the service device to the central device and/or the at least one user terminal.

12. A service device according to claim 8, wherein a memory device is configured to store a first software identification of software data, and wherein the computing device is further configured to:

read, via the first communication link, a second software identification from the central device, such second software identification being indicative of the software data on the central device, compare the first software identification and the second software identification, and in response to determining that the first software identification and the second software identification differ, to transmit the software data to the central device via the first communication link.

13. A service device according to claim 8, wherein the computing device is further configured to recognize a difference between system information stored in a memory device and the system information from the central device, and wherein the computing device is configured to recognize the difference upon establishment of the first communication link between the central device and the service device.

14. The service device according to claim 8, further comprising an indication device configured to output an indication when receiving of the system information by the communication device is complete.

15. The service device according to claim 8, wherein the system information comprises at least one of the following:
    data comprising information about at least one component of the fire protection system, and/or
    data comprising information about a setting of the fire protection system, and/or
    data comprising information about an operating state of the fire protection system.

16. The service device according to claim 8, wherein the computing device is further configured to check the at least one user input and, in response to the checking, generate a check indication for transmission to the user terminal.

17. The service device according to claim 8, wherein the at least one user input comprises authenticating the at least one user terminal.

18. A fire protection system comprising the central device, wherein the central device is configured to be communicatively connected to the service device according to claim 8.

19. A system for operating a fire protection system, comprising:
    at least one service device,
    at least one central device of the fire protection system comprising a central computing device, and
    at least one user terminal,
        wherein the at least one service device includes:
            a communication device which is configured to:
        communicate with the at least one central device of the fire protection system via a first bidirectional communication link and to communicate with at least one user terminal via a second bidirectional communication link in order to grant the at least one user terminal access to at least a part of system information of the fire protection system, and
        at least one computing device configured to:
            receive the system information from the at least one central device and to process it for transmission to the at least one user terminal, receive at least one user input from the at least one user terminal in response to the system information, and perform adjustment of the system information of the fire protection system based on the at least one user input;
    wherein the at least one service device is configured to communicate with the central computing device of the at least one central device via the first bidirectional communication link, and
    wherein the at least one service device is arranged as an internal service module of the at least one central device.

20. The system according to claim 19, wherein the at least one user terminal comprises a graphical user interface, wherein the graphical user interface is configured to display a graphical representation of the system information.

21. The system according to claim 19, wherein the central device comprises a central memory device for storing a software identification indicative of software data on the central device, wherein the at least one user terminal is configured to receive a request for transmission of software data from the service device and, in response to the request, to allow a transmission of the software data from the service device to the central device.

22. The system according to claim 19, wherein the system information comprises state information indicative of a state of at least one peripheral device of the fire protection system, and wherein the service device is configured to generate at least one state indication of a state of the at least one peripheral device and/or the fire protection system on the basis of an evaluation of the state information.

23. A system for operating a fire protection system, comprising:
    at least one service device,
    at least one central device of the fire protection system comprising a central computing device, and
    at least one user terminal,
        wherein the at least one service device includes:
            a communication device which is configured to: communicate with the at least one central device of the fire protection system via a first bidirectional communication link and to communicate with at least one user terminal via a second bidirectional communication link in order to grant the at least one user terminal access to at least a part of system information of the fire protection system, and at least one computing device configured to:
        receive the system information from the at least one central device and to process it for transmission to the at least one user terminal, receive at least one user input from the at least one user terminal in response to the system information, and perform adjustment of the system information of the fire protection system based on the at least one user input;
    wherein the at least one service device is configured to communicate with the central computing device of the at least one central device via the first bidirectional communication link,
    wherein the central device comprises a central memory device for storing a software identification indicative of software data on the central device, wherein the at least one user terminal is configured to receive a request for transmission of software data from the service device and, in response to the request, to allow a transmission of the software data from the service device to the central device; and
    wherein the central device is further configured to receive the software data transmitted from the service device.

24. A system for operating a fire protection system, comprising:
    at least one service device,
    at least one central device of the fire protection system comprising a central computing device,
    at least one user terminal,
        wherein the at least one service device includes:
            a communication device which is configured to:
        communicate with the at least one central device of the fire protection system via a first bidirectional communication link and to communicate with at least one user terminal via a second bidirectional communication link in order to grant the at least one user terminal access to at least a part of system information of the fire protection system, and
    at least one computing device configured to:
        receive the system information from the at least one central device and to process it for transmission to the at least one user terminal, receive at least one user input from the at least one user terminal in response to the system information, and perform adjustment of the system information of the fire protection system based on the at least one user input; and at least one peripheral device of the fire protection system,
   wherein the at least one service device is configured to communicate with the central computing device of the at least one central device via the first bidirectional communication link,
   wherein the system information comprises state information indicative of a state of the at least one peripheral device of the fire protection system, and
   wherein the service device is configured to generate at least one state indication of a state of the at least one peripheral device and/or the fire protection system on the basis of an evaluation of the state information.

25. The system of claim 24, wherein the at least one user terminal is configured to output the at least one state indication to a user.

26. A method for operating a fire protection system, comprising:
   transmitting system information via a first bidirectional communication link from a central device of the fire protection system to a service device,
   processing of the system information by the service device,
   transmitting at least a part of the system information via a second bidirectional communication link to at least one user terminal to allow the user terminal to access at least part of the system information of the fire protection system,
   receiving at least one user input from the user terminal in response to the transmitted system information,
   adjusting the system information of the fire protection system based on the at least one user input,
   receiving the system information by the central device, wherein the system information is indicative of a current state of one or more peripheral devices of the fire protection system,
   evaluating of the system information by a computing device of the service device, and
   generating of a state indication on the basis of the evaluating by the computing device.

27. The method according to claim 26, further comprising:
   transmitting the state indication from the service device to the at least one user terminal, and
   outputting the state indication to a user by the at least one user terminal.

* * * * *